United States Patent [19]
Gruenberg

[11] Patent Number: 6,075,817
[45] Date of Patent: Jun. 13, 2000

[54] COMPRESSIVE COMMUNICATION AND STORAGE SYSTEM

[75] Inventor: Elliot L. Gruenberg, West New York, N.J.

[73] Assignee: Digital Compression Technology, New York, N.Y.

[21] Appl. No.: 08/518,007

[22] Filed: Aug. 22, 1995

Related U.S. Application Data

[63] Continuation-in-part of application No. 08/150,231, Nov. 3, 1993, abandoned, which is a continuation-in-part of application No. 07/812,417, Dec. 23, 1991, abandoned.

[51] Int. Cl.[7] .................................................. H04B 1/66
[52] U.S. Cl. ............................ 375/240; 375/377; 380/42
[58] Field of Search .................................. 375/240, 377; 380/42–47; 341/50, 51, 56, 67, 68

[56] References Cited

U.S. PATENT DOCUMENTS

| | | | |
|---|---|---|---|
| 4,451,699 | 5/1984 | Gruenburg | 455/17 |
| 4,805,216 | 2/1989 | Gruenburg | 380/21 |
| 5,029,210 | 7/1991 | Gruenburg | 380/46 |

*Primary Examiner*—Chi H. Pham
*Assistant Examiner*—Bryan Webster
*Attorney, Agent, or Firm*—Lieberman & Nowak, LLP

[57] ABSTRACT

This invention describes a compressive method of transmitting digital information. Parallel communication branches are coded to transmit ensembles of bits coded so that they can be added together and forwarded over a single transmitted channel without interference. Decoding occurs at a receiving station. In accordance with the invention an iterative method of modulating multiple simultaneous signals is accomplished, so that multiple closely spaced signals can pass through a narrow bandpass filter, where the bandwidth of the communications highway connecting a transmit and receive station is determined by the communication bit rate of the simultaneous bit ensemble. The invention is also advantageously applicable to a compressive digital storage system.

22 Claims, 31 Drawing Sheets

| n | CODE | | | | | | | |
|---|---|---|---|---|---|---|---|---|
| 1 | 0 | 0 | 0 | 0 | 0 | 0 | 0 | 0 |
| 2 | 0 | 1 | 0 | 1 | 0 | 0 | 0 | 1 |
| 3 | 0 | 0 | 1 | 1 | 0 | 0 | 1 | 1 |
| 4 | 0 | 1 | 1 | 0 | 0 | 1 | 1 | 0 |
| 5 | 0 | 0 | 0 | 0 | 1 | 1 | 1 | 1 |
| 6 | 0 | 1 | 0 | 1 | 1 | 0 | 1 | 0 |
| 7 | 0 | 0 | 1 | 1 | 1 | 1 | 0 | 0 |
| 8 | 0 | 1 | 1 | 0 | 1 | 1 | 0 | 1 |

FIG. 2
PRIOR ART

ORTHOGONAL CODES FOR n = 8 PIXELS

SUPERRESONANT TRANSMITTER
CHANNEL CIRCUIT

SUPERRESONANT RECEIVER BRANCH CIRCUIT

| COL | 1 | 2 | 3 | 4 | 5 | 6 | 7 | 8 | 9 |
|---|---|---|---|---|---|---|---|---|---|
| | BIT INPT | PIXEL NO. | TRANSM CODE | TRANS BIT | TRANS INVERTR SETTING | AMP ON TRANS LINE 112 | RECVD AMP @ PIXEL | RECVD BIT @ PIXEL | AMP ON FDBK LINE 113 |
| ROW | | | | | | | | | |
| 1 | 1 | 1 | $\Delta\phi_1[f_1]$ | ⎍⎍ | ⎍⎍ | $f_1$ | $f_1$ | ⎍ | $f_1$ |
| 2 | 1 | 2 | $\Delta\phi_2[f_2]$ | ⎍⎍ | ⎍⎍ | $f_2$ | $f_2$ | ⎍ | $f_2$ |
| | | | | | | Pk pwr=2 | | | |
| 3 | 0 | 1 | $\Delta\phi_1[f_1]$ | — | — | — | — | — | — |
| 4 | 0 | 2 | $\Delta\phi_2[f_2]$ | — | — | — | — | — | — |
| | | | | | | Pk Pwr=0 | | | |
| 5 | 0 | 1 | $\Delta\phi_1[f_1]$ | — | — | — | — | — | — |
| 6 | 1 | 2 | $\Delta\phi_2[f_2]$ | ⎍⎍ | ⎍⎍ | $f_2$ | $f_2$ | ⎍ | $f_2$ |
| | | | | | | Pk Pwr=1 | | | |
| 7 | 1 | 1 | $\Delta\phi_1[f_1]$ | ⎍⎍ | ⎍⎍ | $f_1$ | $f_1$ | ⎍ | $f_1$ |
| 8 | 0 | 2 | $\Delta\phi_2[f_2]$ | — | — | — | — | — | — |
| 9 | 1 | 3 | $\Delta\phi_3[f_3]$ | ⎍⎍ | ⎍⎍ | $f_3$ | $f_3$ | ⎍ | $f_3$ |
| 10 | 1 | 4 | $\Delta\phi_4[f_4]$ | ⎍⎍ | ⎍⎍ | $f_4$ | $f_4$ | ⎍ | $f_4$ |
| | | | | | | Pk Pwr=3 | | | |

FIG. 12

|  | $C_{x3}$ $C_{x1}$ | $C_{x3}$ $C_{x2}$ | $C_{x4}$ $C_{x1}$ | $C_{x4}$ $C_{x2}$ |
|---|---|---|---|---|
| $C_{y1}$ $C_{y3}$ | 1 | 2 | 3 | 4 |
| $C_{y2}$ $C_{y3}$ | 5 | 6 | 7 | 8 |
| $C_{y1}$ $C_{y4}$ | 9 | 10 | 11 | 12 |
| $C_{y2}$ $C_{y4}$ | 13 | 14 | 15 | 16 |

AMPLIFIER TYPE

TRANSFORMER TYPE

EXP. TEST SETUP

COMPRESSIVE COMMUNICATION AND STORAGE SYSTEM

RELATED APPLICATIONS

This is a continuation-in-part application of U.S. patent application, Ser. No. 08/150,231 abandoned, filed Nov. 3, 1993, which in turn is a continuation-in-part of U.S. patent application, Ser. No. 07/812,417 filed Dec. 23, 1991 ABN.

FIELD OF INVENTION

The present invention relates to apparatus and method for transmitting and storing digitized video and other graphic information, which method requires significantly less bandwidth and memory.

DESCRIPTION OF THE PRIOR ART

In U.S. Pat. No. 5,029,210, issued in July of 1991, a cooperative communication system was described. This patent demonstrates principles of operation of a communication system, which principles have in part been used in the present invention. The teachings of U.S. Pat. No. 5,029,210 are hereby incorporated herein by reference.

Using those principles and additional inventive concepts, a new communications transmission system has been developed which greatly reduces the bandwidth requirements for transmitting television or other digitized information. Additionally, the method significantly reduces bandwidth needed for digital transmission used for any kind of information.

Previous methods of TV transmission required that the material be scanned by an electronic beam at high speed to cover a large number of pixels or illuminated spots in a raster-like field-of-view which is generally identified as a screen. At the reception end, the received illumination values for the pixels are reproduced and located in corresponding pixel positions on the screen of a device such as a cathode ray tube. In this method the pixels are transmitted sequentially. Thus, a scene containing 500×500 or 250,000 pixel locations must be sent to the receiving location in a time interval of approximately $\frac{1}{30}$th of a second, which time interval is governed by the refresh time necessary for the persistence of vision. Such a method results in a transmission bandwidth requirement of 7.5 megahertz. However, interlace methods are used presently to reduce the requirement to somewhat under 4 megahertz.

There is presently a demand for even higher definition than a 500×500 pixel raster, for example, 1,000×1,000 or 1,000,000 pixel images are being contemplated in high definition TV (HDTV).

The present transmission system eliminates the scanning requirement and provides for a method of parallel transmission of information from the transmitted screen to the received screen. It is anticipated that such video information can be transmitted with the present system with a bandwidth as low as 60 hertz.

It is, therefore, an objective of the invention to provide a transmission system requiring greatly reduced bandwidth, yet allowing the transmission of high definition video information.

It is a further objective of this invention to provide a digital transmission of increased information transmission capacity operable on narrow and wide band transmission mediums.

It is an object of this invention to provide a digital transmission system for video and other data which requires drastically less power for transmission of the same information data rate.

It is an object of this invention to facilitate secure high data rate transmission.

It is an object of this invention to reduce significantly the number and complexity of codes required to improve the rate of information transmission over narrow band facilities.

It is an object of this invention to improve the connectivity of networked computers and similar devices and terminals.

It is an object of this invention to facilitate two-way video transmission systems such as video telephones.

It is an object of this invention to simplify transmission of three dimensional graphics.

It is also an object of this invention to store images and other blocks of data in substantially less memory space by efficiently and rapidly encoding and retrieving such data.

SUMMARY OF INVENTION

In normal transmission of video material, the information is divided into elementary areas (pixels), and these areas are scanned by a beam at a rate determined by the motion of objects in the scene, or by storage time of the eye (flicker) and by the number of elements to be scanned. The receiver is synchronized to the scan rate so that the receiver places the pixel in the right location on the screen.

In such an arrangement, the transmission rate is determined almost entirely by the requirement of placing the pixel in the right place and very little by the actual change of information in the scene. Since the plan of pixel location is known to the sender and the receiver, much savings can be made in transmission by sending a coded designation of pixel location whenever a pixel is a "1" and send no such designation when the pixel is "0". (Gray Scales can be handled by a sequence of "bit" planes to be discussed separately, but in the final analysis this amounts to an increase in the number of digital pixels).

Prior methods of transmitting wide band data, such as TV, other than by the time division method just described, include assigning a separate frequency channel for each input (pixel), or assigning a separate code per pixel. The receiver must employ a corresponding frequency channel for each pixel, the width of which must be wide enough to accommodate the possible time rate of change of the pixel information. Sufficient bandwidth must be provided for the transmission of any, or all, of the pixel information, or $n(1/t)$ where t is the shortest time change of pixel information to be expected and n is the maximum number of pixels per raster. Therefore, this method requires the same bandwidth as the sequentially transmitted scanned method presently in use.

If we attempt to send all the pixels of a scene at the same time so that the channel bandwidth may be made equal to the rate of change of the scene (the frame rate), we are faced with sending a large group of bits simultaneously. Using existing means, a unique amplitude (or phase, or combination of phase and amplitude) level must be transmitted which represents a number which, in turn, specifies a group of bits which then designates the group of pixels existing during that interval. The receiver can then determine exactly which group was sent. When the group consists of n possible bits, the number of combinations of n bits in such groups is $2^n$. This number rapidly becomes large and impractical to handle as n increases. As is well known, as the number of levels increases so does the signal to noise ratio and, in turn, the required transmitting power. See FIG. 1 which shows how this power increases exponentially with the compression ratio. In contrast, the invention system power increases only linearly with the compression ratio.

The method by which the instant invention avoids this problem is to provide a way for the receiver to distinguish each bit of each group individually. The inventive method is based on coding the individual bit positions in the group. These codes have orthogonal properties. Orthogonality may be explained as follows: given a group of simultaneous signals $x_i(t)$ which exist during the period nT, such signals would be orthogonal if:

$$\int_0^{nT} x_i(t)x_j(t)dt = 1 \ i=j = 0 \ i \neq jx$$

This means that if the bits are represented by orthogonal waveshapes that exist for a period of time nT, then at the end of the period the integrated value of the multiplication of two members of the group, i and j, will be 0 unless members i and j are equal (have the same wave shape) in which case the result is 1. When a signal $x_i(t)$ is sent to a receiver which has stored such wave shapes, and means to multiply them with the transmitted signals, only the $x_i(t)$ code would show an output at the end of the nT period.

Two general types of orthogonal coded signals are the coded phase coherent method and the PFM type which are described in The Handbook of Telemetry and Remote Control (Gruenberg, McGraw Hill, 1967) pp 9–39 through 9–54. It should be noted that these methods have only been used by their originators to send one code of a group at a time. This amounts to increasing the time to send a group of pixels exponentially by a factor of $2^n$. In the coded phase coherent method, due to Viterbi, the $x_i(t)$ wave shape consists of a series of n carrier pulses of duration T, each of which has the same amplitude but a phase of either 0 or 180 degrees; i.e, $(a)(\cos)(\omega t+v\pi)$ where v=0 or 1. Certain patterns of such sequences are orthogonal, such as are shown in FIG. 2 showing orthogonal codes for n=8 pixels. These codes require a transmission bandwidth large enough to accommodate the short pulses of duration T. With the instant invention, it is possible to send a number of such coded signals simultaneously which can be decoded uniquely by energy detection. However, it has been found that n coded bits required a transmission bandwidth of n, resulting in the same bandwidth as for one bit, but the signal to noise ratio is reduced by a factor of n, so this method reduces power requirements rather than bandwidth.

The other method, PFM, due to Rochelle, makes use of sine waves of different frequencies to achieve orthogonality. Thus:

$$x_i(t) = \sin \omega_i t$$

and $$x_j(t) = \sin (\omega_i + 2\pi v/nT)t + \phi)$$

where $\omega_i(t)$=carrier frequency (reference)

v=±1, ±2, ±3 etc.

nT=duration of coded bit, as before

φ=initial phase

The allowable spacing when φ=0 is Δf=½ nT. But 1/nT is the channel width required for one bit, so this method improves the bandwidth by a factor of 2. Otherwise, this method also requires the bandwidth to expand as the number of parallel bits increases.

This invention employs a new method of providing the equivalent effect of orthogonal codes while at the same time reducing bandwidth. The principle of operation depends upon recirculation of signals at both the transmitter and the receiver.

BRIEF DESCRIPTION OF THE DRAWINGS

FIG. 2 shows an example of orthogonal codes;

FIG. 12 is a diagram to facilitate understanding of the operation of the transmission system of FIG. 11;

FIG. 14C shows binary coded two dimensional coding for n=16;

FIG. 14E shows binary coded two dimensional coding for n=256;

DETAILED DESCRIPTION

Figure 3A:
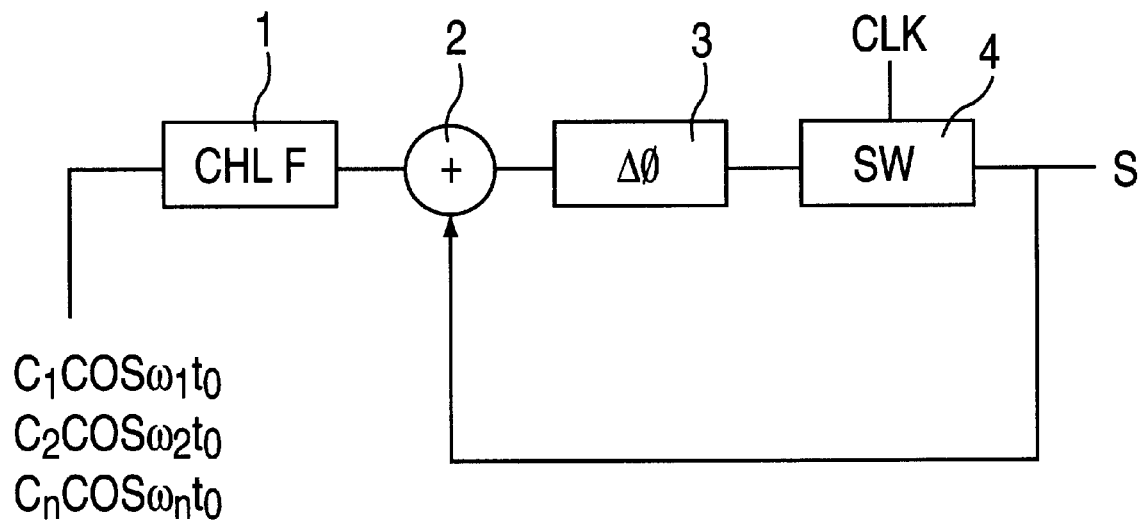
FIGS. 3A and 3B show the phased summing method in accordance with the invention.
Figure 3B:
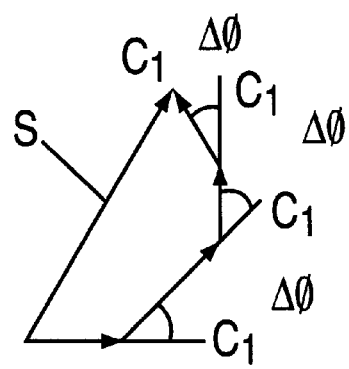

It is well known that the sum of sine waves of equal amplitudes but of fixed phase difference between each member is:

$$\sum_{0}^{n-1} e^{j(wt+n\Delta\phi)} = \frac{\sin((n\Delta\phi)/2)}{\sin((\Delta\phi)/2)} e^{jwt}$$

where $\Delta\phi$ is the phase difference between the members which can be visualized as vectors. This sum can be formed from the input to a transmitter by adding inputs phase shifted by $\Delta\phi$ to the input as shown in FIGS. 3A and 3B. We assume here that the signal input, $e^{jwt}$ are configured to sum with the amplitude in each path (branch).

In FIG. 3A, Item 1 is a channel filter allowing a band of frequencies to be received and supplied to the summer 2. The output of the adder is phase shifted in 3, which is a phase shifting device the phase shift of which is a function of frequency. The output of 3 is switched on or off by 4 in accordance with a control signal which may be data or timing bits. The switch output is fed back to the summer 2 and adds to the input in a phased manner as shown in vector form in FIG. 3B. That figure assumes there is no time delay around the loop.

Figure 4:
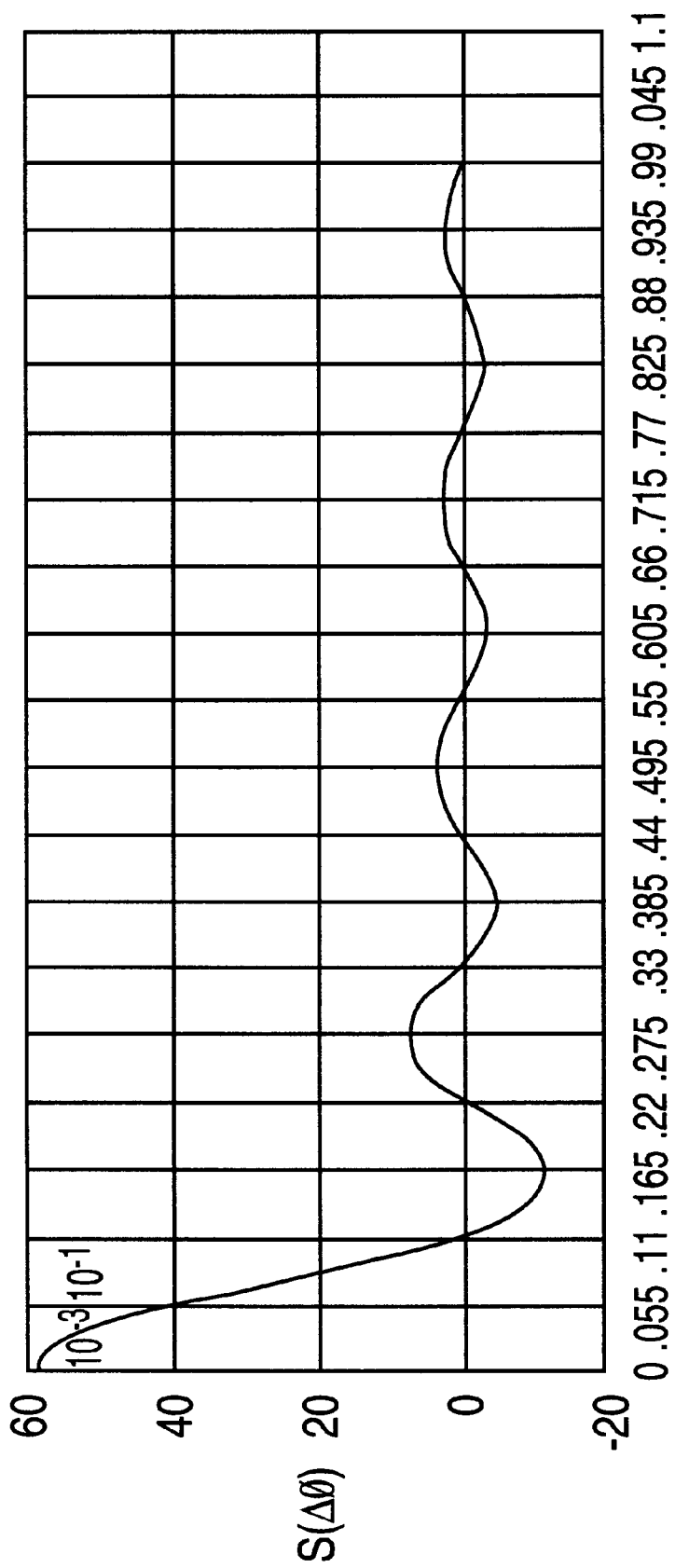
FIG. 4 shows the resulting output of the phase summing method versus vector phase difference Δφ for n=60.
Figure 5:
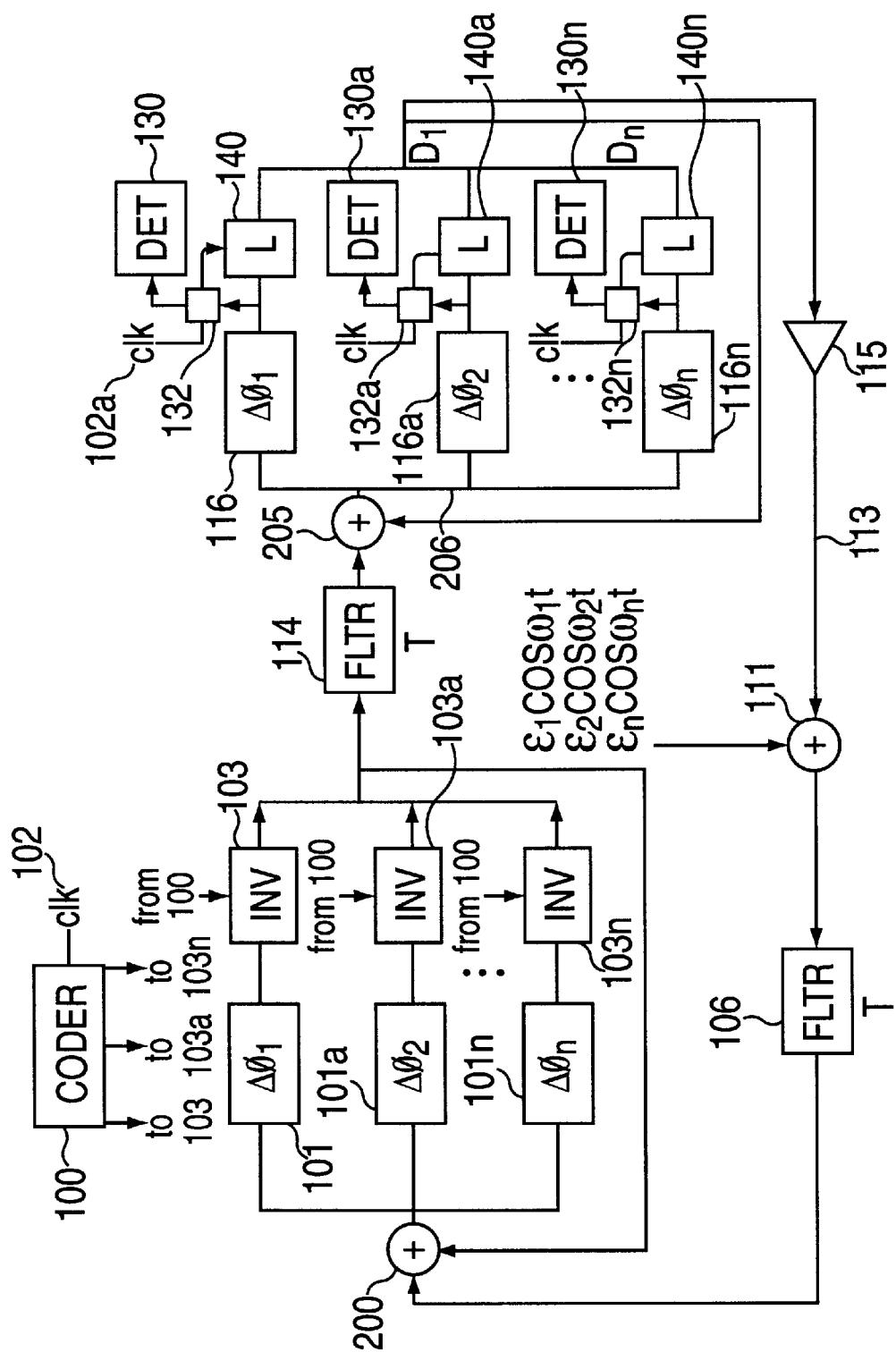
FIG. 5 illustrates a block diagram of the inventive system employing the phase summing method.

If now the $\Delta\phi$'s in the branches (paths) are made functions of the frequencies of input signals in the same manner as was done in the transmitter, the paths will be independently responsive to the incoming signals according to their frequencies. Thus, an incoming group of signals to the sender will be enhanced by the arrangement of FIG. 3. The input signals remain substantially unchanged during this summing. A resulting plot for n=60 is shown in FIG. 4. This plot shows that for $\Delta\phi$=0 the output is n=60 but for $\Delta\phi$ greater than $\pi/n$ the magnitude is close to 0. Thus, a group of such paths phase shifted $2\pi/n$ from each other will essentially not interfere with each other. A switched phase inverter is connected to each independent phase path to control the built up signals in each path by inserting a 180° phase shift under the control of an information bit. When this is done, the summer becomes a subtractor and eliminates signal from that path. FIG. 5 shows such an arrangement for sending such bit controlled incremental phased signals.

The system consists of a transmit and receive location in each of which there are several branches. Phase shifters 101, 101a, 101b, . . . 101n are located in each of the transmit station branches. Each of these phase shifts $\Delta\phi_1$, $\Delta\phi_2$, . . . $\Delta\phi_n$, varies distinctively with frequency. Switched Inverters 103, 103a, 103b, . . . 103n are also in the respective branches. These switches are responsive to control signals from coder 100 which supplies different digital control pulse sequences to the individual branches. These switches may invert the phase of the branch signal, as stated above, or simply turn the branch on and off in accordance with the control signal. The timing is controlled by the clock 102. The outputs of all the branches are supplied to the adder 200 which also receives a band of signals from filter 106. This band of signals, $\epsilon_1\cos\omega_1 t$, $\epsilon_2\cos\omega_2 t$, . . . $\epsilon_n\cos\omega_n t$, may originate from noise or a return path from the receiver.

Filter 114 represents the transmission channel bandpass. A group of frequencies selected by the transmitter process is supplied to adder 205, which sums this input with all of the outputs of the receiver branches. The output of 205 goes to all of the branches. Phase shifters 116, 116a, 116b, . . . 116n are similar to 101, 101a, 101b, . . . 101n and provide corresponding phase shifts for the same frequency of the corresponding transmitter branch. Units 140, 140a, . . . 140n limit the build up of signal in the branches. This is done by opening the channel for bit length periods only controlled by clock 102a. Bits are detected by amplitude detectors 130, 130a, . . . 130n when the built-up signals exceed a threshold. As shown in FIG. 5, gates 132, 132a, . . . , 132n enable signal flow to respective amplitude detectors 130, 130a, . . . , 130n while enabling simultaneous control of limiting units 140, 140a, . . . , 140n in accordance with the clock 102a. Clocks 102 and 102a must be synchronized. Amplifier 115 may be used to offset transmission loss between receiver and transmitter.

Figure 6:
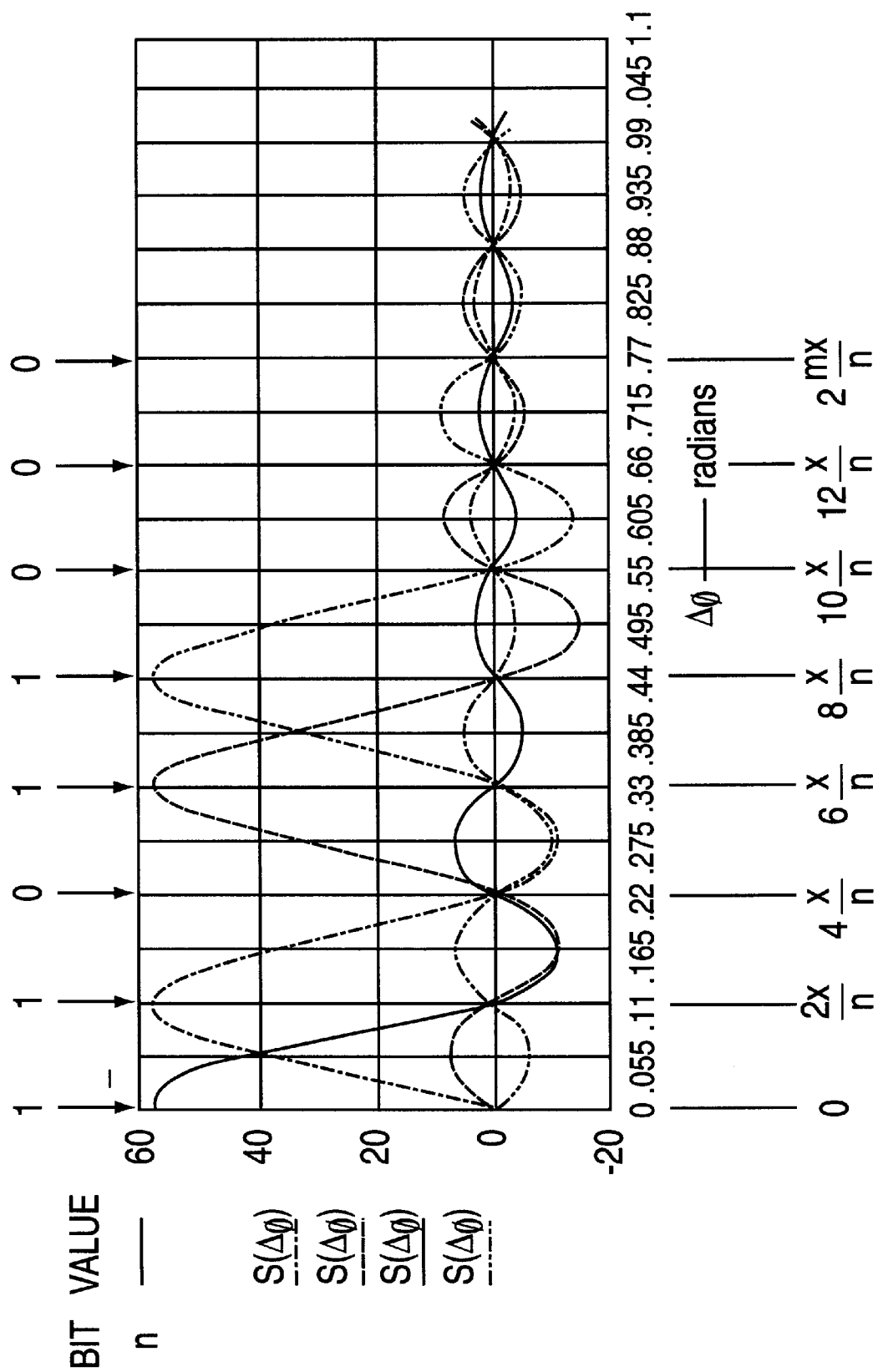
FIG. 6 illustrates the resulting output of the phase summing method, versus vector phase difference Δφ for four inputs and for n=60.

FIG. 6 shows the result of empowering four paths and suppressing one path. The plot shows that the suppressed path can clearly be distinguished. Although FIG. 6 was plotted for n=60, the results can be generalized for any value of n. The graph shows the points $\Delta\phi$ 2 $\pi/n$, 4 $\pi/n$, bit/n, etc., which are sampling points for determining the presence of a "1" or "0" bit. Bit values for the bits present are shown at the top of the graph. It is clear that all other bits have zero outputs at the sampling point for a given bit. This means that there is no inter symbol interference for any size n of the ensemble of parallel bits when encoded by this method.

Figure 7:
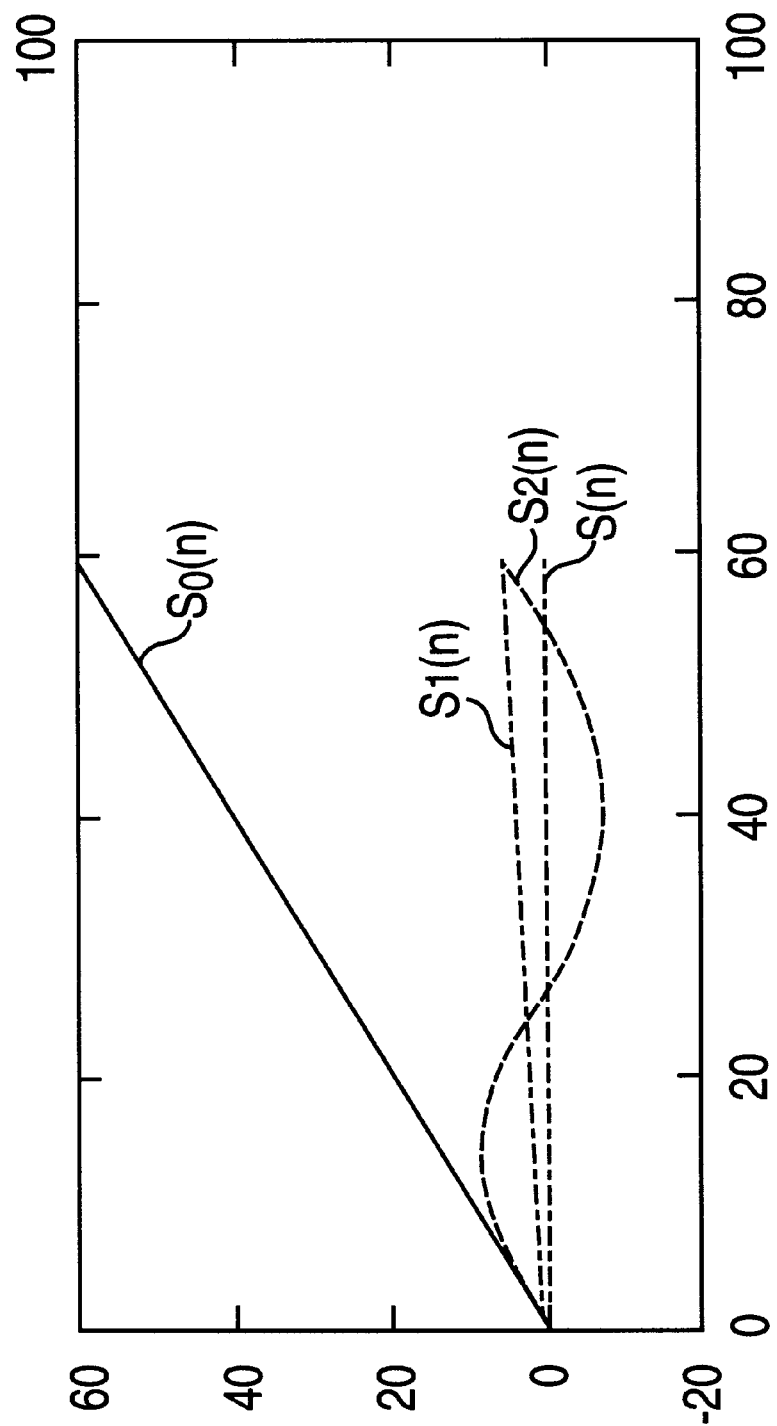
FIG. 7 shows the amplitude output of the phase difference method as a function of the n circulations for signal inputs of different frequencies.

The inputs are enhanced by a factor of n in amplitude unless they are suppressed by the inverter action. Furthermore, this enhancement is controlled by a clock to occur over subintervals T of a bit interval nT, so that the enhancement in amplitude grows gradually over the bit interval nT as shown in FIG. 7. This means that a bandpass filter of bandwidth 1/nT will pass the output signals of the recirculatory system. At the same time, inputs to the receiver will be enhanced differently in each branch in accordance with the phase code of that branch so that receiving branches of identical codes will respond only to the frequency of the corresponding sending branch.

Figure 8:
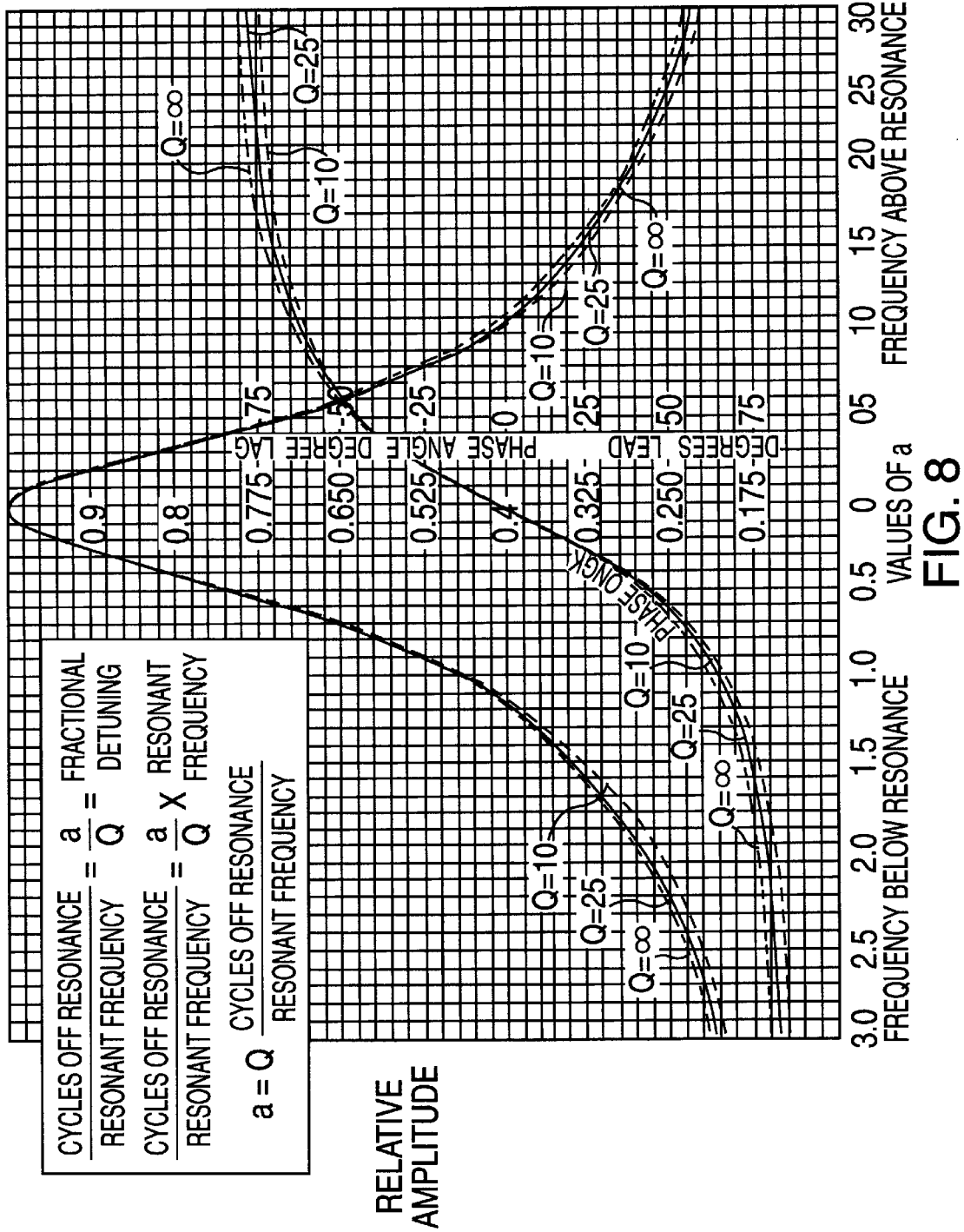
FIG. 8 illustrates the Universal Resonance Curve of a series resonant circuit.

One method of making the phase difference $\Delta\phi$ a function of frequency is to use a tuned circuit in each branch (path), the center frequency of which establishes the frequency at which the phase shift in that path is 0 (zero). The universal resonance curve, as shown in Terman *Radio Engineers' Handbook (McGraw Hill* 1943) page 137, and presented here in FIG. 8, shows that the phase shift off resonance in a series resonant circuit is linear with frequency off resonance $\Delta f$ over ±45° while the amplitude variation is less than 3 db. As FIG. 4 shows, a shift of only 6° (0.1 radian) is sufficient to reduce the amplitude to 0 for n=60. The off resonance frequency difference is given by the expression:

$$\Delta f = (a/Q)f_0$$

where $f_0$ is the resonant frequency

Q is the Q of the resonant circuit a is the fractional detuning factor

For a 6° phase shift a is 0.05 so that for a Q of 50 the fractional detuning would be 0.05/50 or 1/1000 of $f_0$. If 1/nT is the channel bandwidth available then $\Delta f$ must be $1/n^2T$ because there are n $\Delta f$'s in the bandwidth 1/nT. If for example 1/nT=500khz then $\Delta f$=500 khz/n. For n=60, $\Delta f$=500 khz/60=8.33 khz. If a=0.05, as before, and $f_0$=500 khz then this spacing can be achieved by using a Q of $a(f_0/\Delta f)$=0.05(500,000/8,333)=0.05×60=3. Thus, a very low Q circuit can be used to separate 60 frequencies within the transmission bandwidth of 500 khz thereby enhancing the data transmission by 60.

From the above we find that $$\Delta\phi = \frac{\pi}{2}a;$$

and that $$\Delta\phi = \frac{\pi}{2} Q \frac{\Delta f}{f_0}$$

The frequency change to move one bit width can be found by setting:

$$\Delta\phi = 2\frac{\pi}{n}$$

Then $$\Delta f = \frac{4}{n} \frac{f_o}{Q}$$

But $$\Delta f = \frac{B}{n}$$

where B is channel width
Then $$Q = \frac{4}{B} f_o$$

and is independent of n.

A single inductance may be used for all of the paths and only individual capacitances in each path (branch), thereby making use of integrated circuit fabrication practical. See FIG. 9. In this FIG. 9, the detailed branch circuits are shown in detail only in the sender unit and replaces the $\Delta\phi$ boxes in FIG. 5 and in the receiver unit of FIGS. 5 and 9. The common inductance L, item 10, and capacitances $C_1, C_2 \ldots C_n$, items 11, 11a ... 11n, constitute individual resonant circuits in each branch. $C_1, C_2 \ldots C_n$, items 11, 11a ... 11n, establish the individual phase shifts $\Delta\phi_1, \Delta\phi_2, \ldots \Delta\phi_n$ of each branch. The inputs to the sender branch system originate from the band limited receive channel of the sender unit as in FIG. 5. These inputs are processed differently by each branch because of the different phase shifts caused by the different frequencies. The phase shifted outputs are extracted from the resistors 12, 12a ... 12n in each resonant circuit. The branches of the receiver operate the same way on the inputs from the common channel 112 and provide outputs to the branch detectors 130, 130a ... 130n in accordance with the individual phase shifts 116, 116a ... 116n. The resulting detected outputs are like those shown in FIG. 6, where each output corresponds to the particular phase shift of the channel if the input frequency is present at the input. Limiters 140, 140a ... 140n are used to prevent branch amplitudes to rise excessively when the system is used in loop mode.

An alternative method of reception has the advantage of discriminating against unwanted input signals to the receiver such as noise and steady signals which remain fixed for the duration of a bit period. It should be recalled that the "1" bit signals received from the sender rise in amplitude over the bit duration. Interfering signals N(t) do not. By changing the receiver summing device item 205 of FIG. 9 to a subtractor, interfering signals will be subtracted after each of then iterations, whereas the signals from the sender will cause a steady output equal to the differential amplitude of the beginning and the end of the iteration interval when "1" bits are sent. The detectors, 130, 130a ... 130n, will detect this output as it will exceed a threshold while the cancelled interfering signals will not. This operation will be enhanced by providing the detectors 130, 130a ... 130n with an integrating or summing capability by using post detection integration and sampling at the end of the bit period. An advantage of this method is that the sender power can be further reduced substantially for higher compression ratios.

Figure 9:
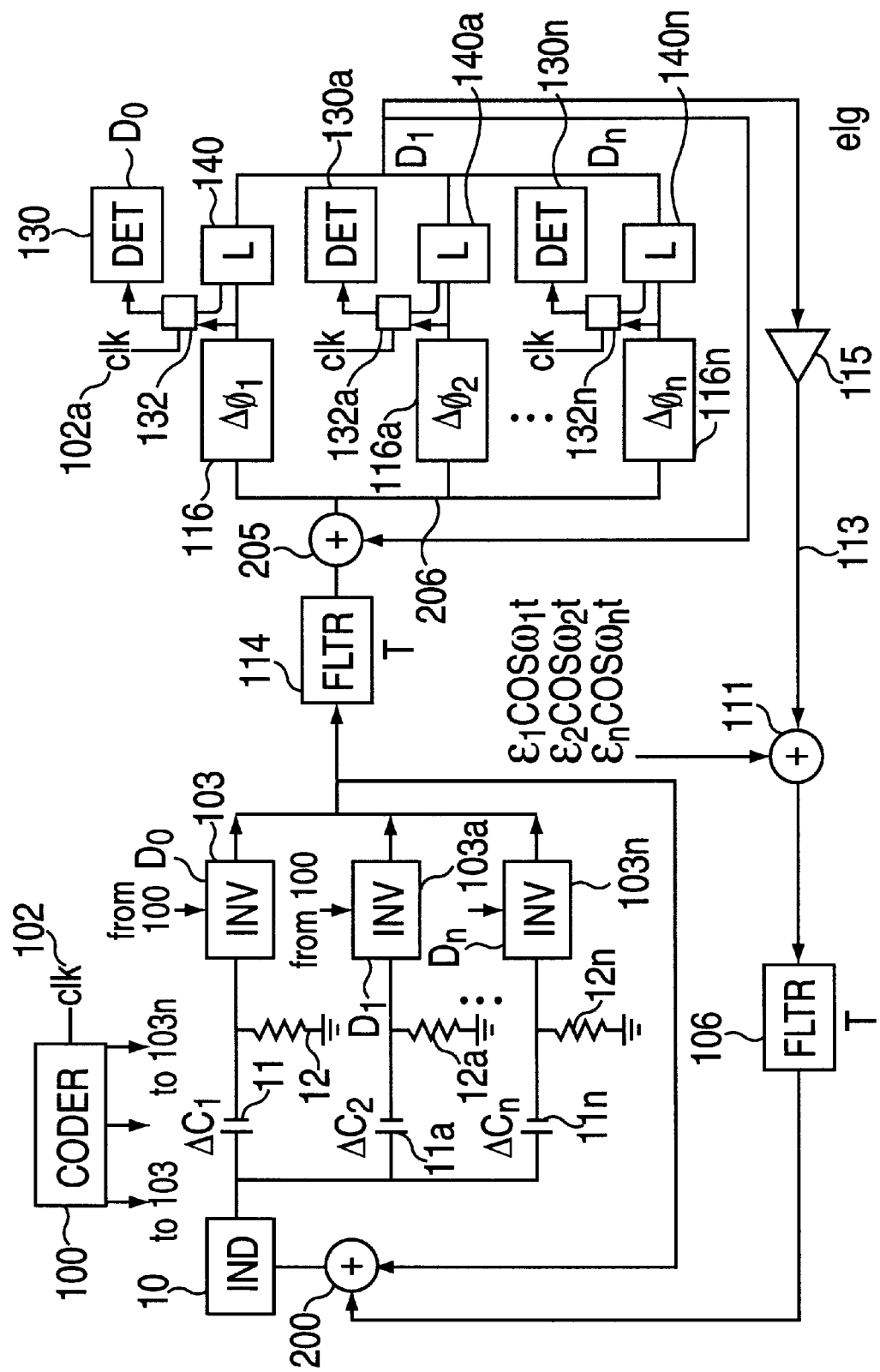
FIG. 9 shows the phase coding method for scanless television system using resonant circuits.

The sender may be connected to the receiver via a feedback path as shown in FIG. 9 using similar methods as taught in "Cooperative Communication System," U.S. Pat. No. 5,029,210. This is used to reinforce the signals chosen by the sender unit and is useful for noise immunity, synchronization of receiver and transmitter (sender), and for security purposes.

The summation selection method just described is similar to the orthogonal methods in that there is a summation equivalent to the integration of the orthogonal processes and the result is obtained at the end of the process at a specific time. The orthogonal processes require multiplication of the waveforms and phase sensitive detection. The summation process does not use any multiplication process, but relies solely on waveform addition and uses energy (amplitude) detection. The summation process enhances the desired input whereas the other methods do not. These features enable the summation method to reduce the frequency spacing between channels over the other methods and enables a great improvement in transmission capacity.

Controlled superresonance is a term which can be used to describe the instant invention, and has the following attributes which enables the system to provide expanded communication channel capacity. The formula:

$$\Delta f = \pi \frac{fo}{nQ}$$

previously derived shows that the required frequency channel width is reduced in proportion to the Q of the tuned circuit used, and the number of recirculations. This number is determined by the finite time interval governed by the information bit width which controls the specific channel. Also implied is that the process starts and stops with each bit interval. The longer this interval the narrower the analog frequency channel required per bit.

This method differs from previous information transmission methods in that no multiplication modulation methods, such as AM, FM, PM are used. Noise signals are enhanced by the unique frequency selective amplification and build-up method.

The recirculation involves propagation time delay around the loops which constitutes a limitation on the number of recirculations possible within the bit time interval. Hence, it is preferred to use local feedback for recirculation, which allows very short propagation times of multiples of nanosecond duration. The local feedback is provided at both transmit and receive locations.

Figure 9A:
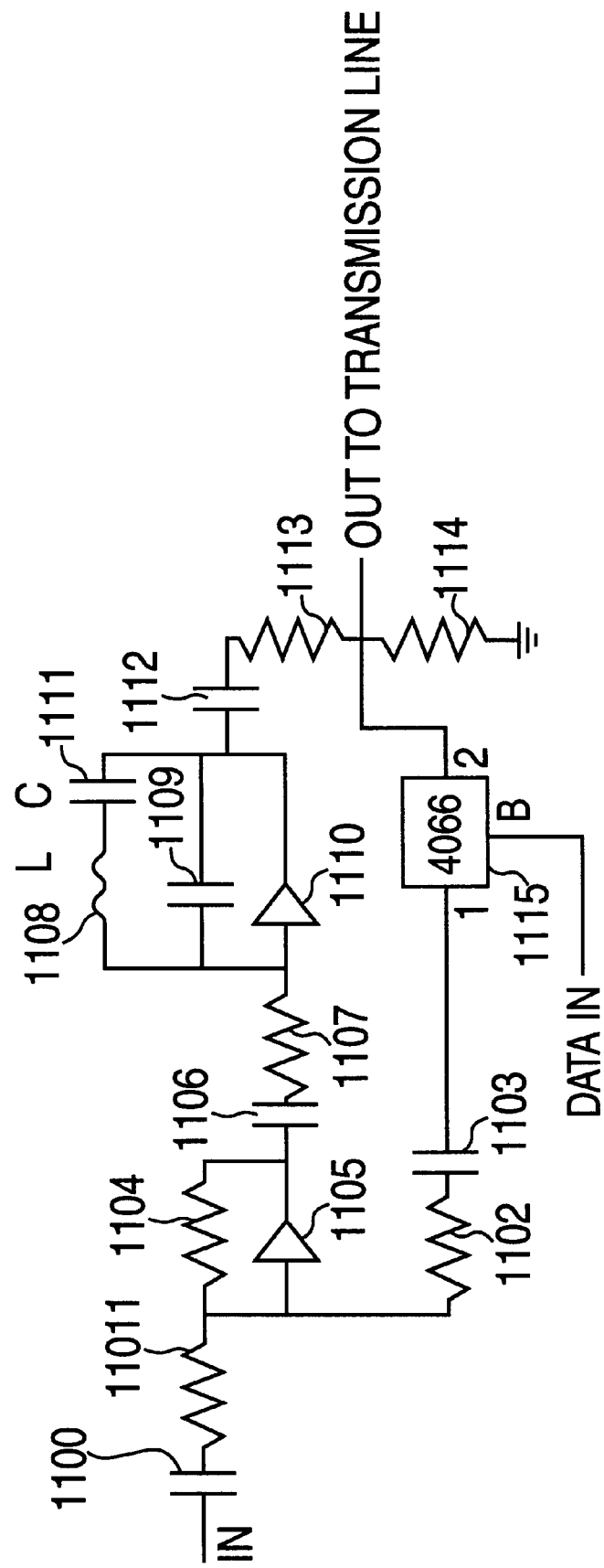
FIG. 9A shows a superresonant transmitter circuit.

FIG. 9A shows a superresonant transmitter. It consists of two stages of amplification U1 and U2, and an analog switch, low amplitude signals, may be entered at capacitor 1100. However, the preferred method of operation is to use the inherent noise of the input amplifier 1105, which will be enhanced by the recirculating loop. It will be recalled that the noise signal is composed of equal amplitude signals over a broad frequency range. Only the frequency components corresponding to the center frequency of the resonant circuit 1108, 1109 will experience a phase 0° shift and maximum gain and that frequency will be enhanced the greatest at the end of the bit time interval and, thus, selected. Resistor 1101 and 1103 operate in conjunction with Resistor 1104 and amplifier 1105 as a feedback controlled amplifier and sums signals received via blocking capacitors 1100 and 1103. The output of this amplifier fed to the second stage of amplification 1110 and coupling capacitor 1106. The gain of this stage is controlled by tuned circuit 1108 and 1109, which is shunted across amplifier 1110 in series with blocking capacitor 1111. The tuned circuit, together with resistor 1107, causes the feedback ratio of the operational amplifier to be a function of frequency. The resonant frequency of the tuned circuit provides the highest resistance and greatest stage gain with the lowest phase shift around the loop of the transmitter unit. The output of this stage is input to the switch 1113 via coupling capacitor 1112. Switch 1113 can be a 4066 integrated circuit which is a readily available integrated circuit chip.

The switch 1113 is controlled by the information bit stream. When a "1" bit is to be transmitted, a control voltage is applied to the 4066 which causes the output of capacitor 1112 to be connected to the divider circuit 1114 and 1115, which provides a lower voltage at the junction of 1114 and 1115. This voltage is lowered to reduce the presence of control voltage crosstalk into the signal path. This voltage is used as output voltage to the transmission line and also as feedback voltage to capacitor 1103, which feeds resistor 1102, on the inputs to summing amplifier 1105. This completes a loop feedback system which causes signals to be continually iteratively added for the duration of the period of the control bit signal.

When the information bit is "0", the control bit will connect the output of 1112 to ground and cuts off the feedback path preventing signal build-up and causes a 0 voltage output for the duration of the "0" bit. In the preferred method of transmission, the loop gain is adjusted to cause sufficient signal build-up from the intrinsic noise in the bit duration.

Figure 9B:
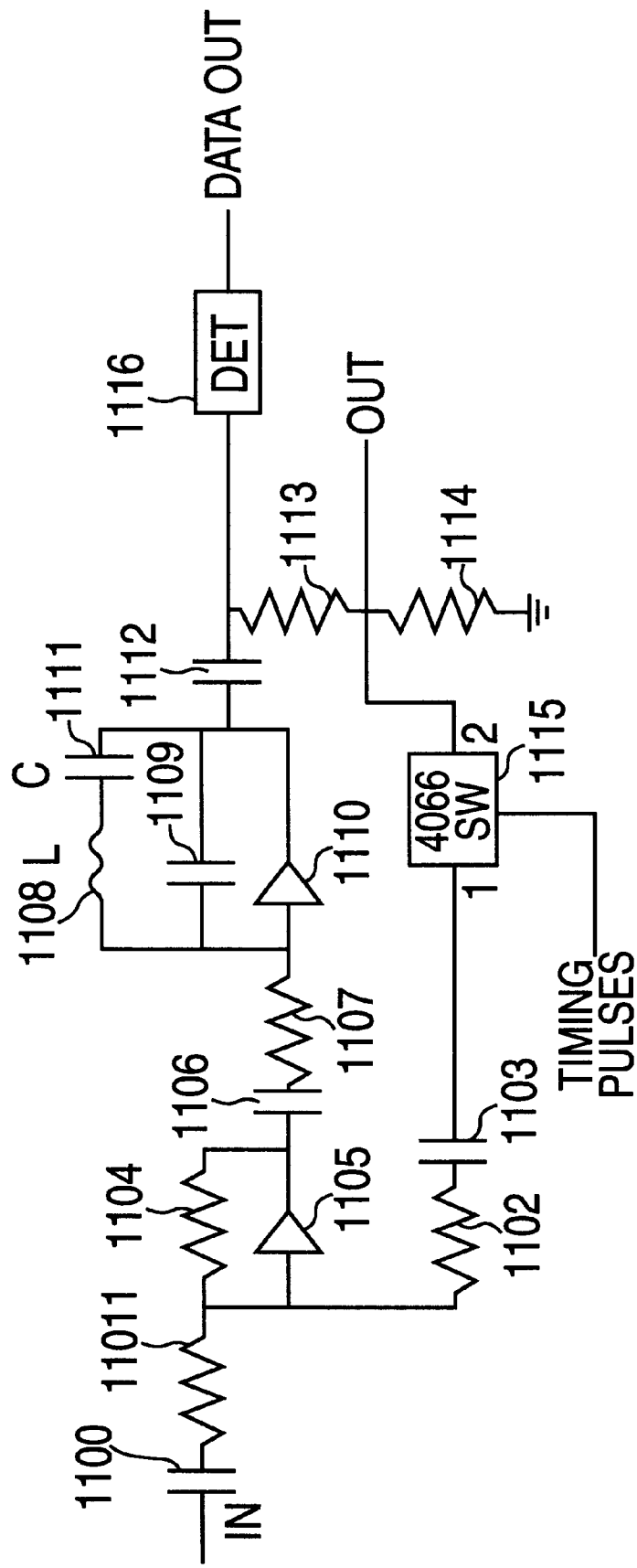
FIG. 9B shows a superresonant receiver circuit.

In the receive mode, (FIG. 9B), the input signal is applied to the input of capacitor 1100 and the gain of the loop is adjusted lower to require a signal of greater amplitude than the intrinsic noise. The control signal applied to the switch 4066 has "on" duration equal to a "1" bit interval and an "off" duration equal to a bit interval. This method is used to prevent excessive build-up for long duration signals. This method requires two receive units tuned to the same resonant frequency to be used for each channel. The control signal for the on period in the second receiver will occur during the off period of the first receiver, and it will call for on when (FIG. 9B) the first receiver is off. In this way, all signals will be received.

An alternative method would require the control signal to be automatically switched after a prescribed number of "1" bits and the receiver control protocol changed to stay on for the same prescribed number of one bit and automatically switch off during the arbitrary off period, but respond as a "1" bit. This would allow the use of only one receiver.

Figure 9C:
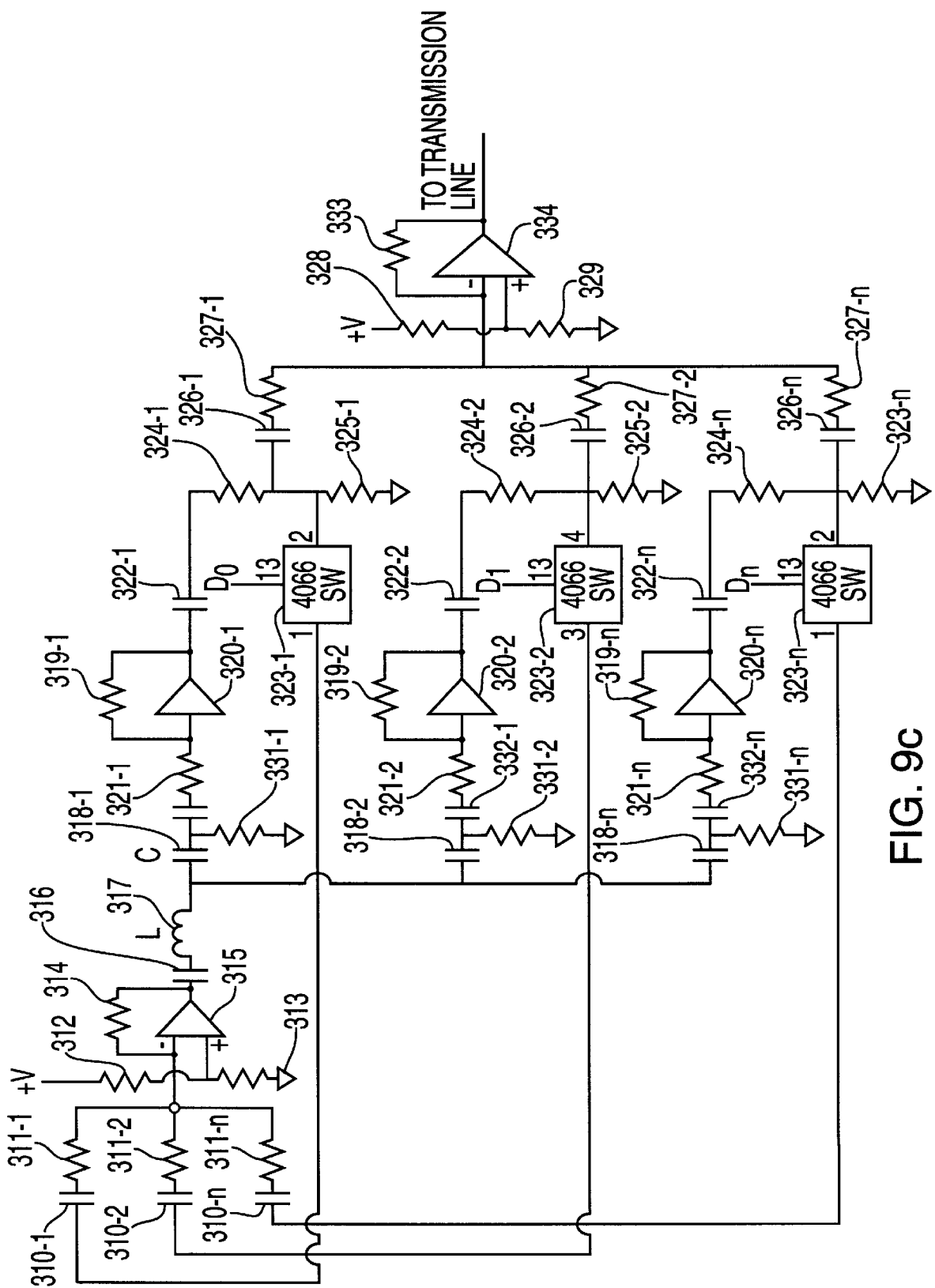
FIG. 9C shows a single inductor transmitter.
Figure 9D:
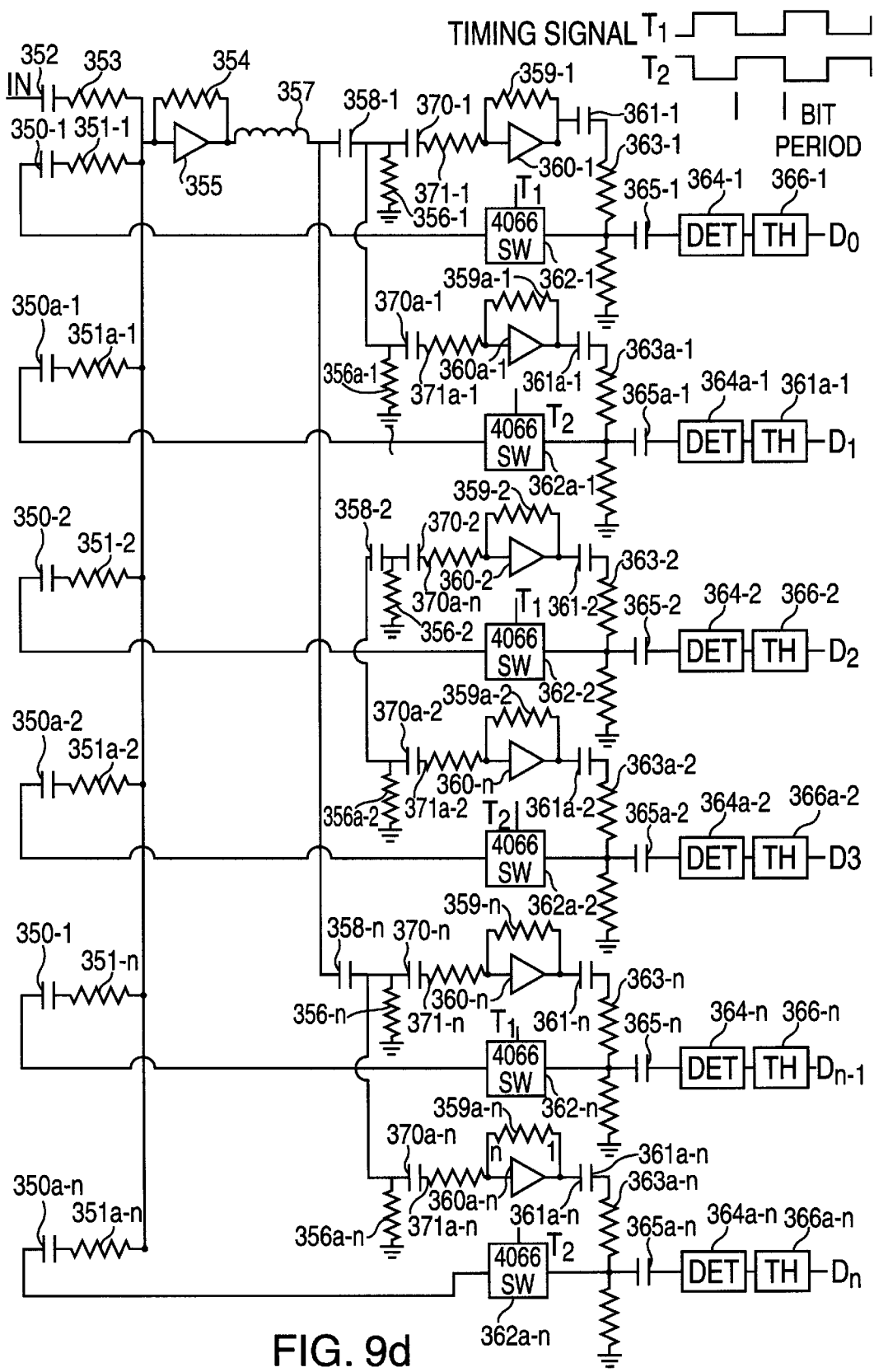
FIG. 9D shows a single inductor receiver.

FIGS. 9C and 9D shows an economical implementation of a multiple channel (bit) system. This system uses a common inductance working with a number of resonant channels. Minimizing the number of inductors is desirable as inductors are the most expensive component of the resonant network.

The transmitter is shown in FIG. 9C. A common op amp 315 is used as a summing amplifier for all of the feedback signals from the multiplicity of channels the feedback signals input the summer amplifier through coupling capacitors 310-1 through 310-n and input resistors 311-1 through 311-m. Resistor 314 sets the gain of the op amp which may be integrated circuit 741 for certain frequency bands. The summing amp 315 provides signal to a common inductor 317, via coupling capacitor 316. This inductor provides signals to all the n channels. Capacitors 318-1 through 318-n are resonant with inductor 317 at different frequencies for each of the channels and provides input impedance (together with conductor 317) to op amps 320-1 through 320-n. Resistors 319-1 through 319-n set the gain of the respective amplifiers together with the series resonant circuits 317 and 318-1 through 318-n. Each op amp feeds switch 323-1 through 323-n via voltage capacitors 322-1 through 322-n and voltage divider 324-1 through 324-n.

The switches 323-1 through 323-n are independently controlled by information bit voltages that allow feedback to be available to a given channel when there is a "1" bit and connects to ground for a zero bit. Because of superresonance, signals will develop from intrinsic noise to large signals after a number of iterations around the loop. The feedback occurs when the Switch 323-x, for example, is connected to the input of summing amp 315. Only those channels will build-up in which a "1" bit has enabled such channels to have feedback through the channels tuned circuit. There is no interaction between the channels.

Similarly, the receiver may use a single inductor to service a number of channels, each having its own frequency determination capacitor. This is shown in FIG. 9D. Provision is made here for separate receivers operating in alternate bit intervals. It was explained previously that the receiver requires finite time to prevent the receiver process from building up excessive amplitude for long "1" bit sequences. Provision is made for reception of signals from the transmission via a capacitor 352 which becomes an input to summing operational amplifier 355 by feeding input resistor 353. Gain of circuit 355 is controlled by the ratio of resistors 353 and 354.

All of the feedback signals of the multiplicity of channels are also input to amp 355 via coupling capacitors 350-1 through 350-n and 350a-1 through 350a-n. The capacitors feed input resistors 351-1 through 351-n and 351a-1 through 351a-n. Amplifier 355 feeds inductor 357.

The inductor 357 series resonates with each of the channel (branch) input capacitors 358-1 through 358-n and 358a-1 through 358a-n, which determine the resonant frequency of the branches. Amplifiers 360-1 . . . 360-n and 360-1 . . . 360a-n receive the signals from their respective input capacitors and will selectively transfer signals primarily at frequencies corresponding to the resonant frequency of the specific channel. The activation of a given channel is controlled by switch 362-x or 362a-x. The switches 362-1 through 362-n and 362a-1 through 362a-n are controlled by timing signals operating at the bit rate; those controlling 362-1 through 362-n, T1, are out of phase with the control signal T2, for 362a-1 through 362a-n, 361-1 through 361-n and 361 a-1 through 361 a-n are coupling capacitors connecting to the respective switches via the voltage dividers 363-1 through 363-n and 363a-1 through 363a-n. The purpose of the dividers is to reduce the crosstalk of the timing control signals with the signal paths.

The output of the divider provides feedback input to the summing amplifier so as to cause an interactive build-up of signals that match the resonant frequency of a given channel.

This output of the divider is also used to detect the presence of signal and is fed to detectors 365 and threshold units 366, via capacitors 365, to report bits wherever signals of a particular resonance occurs.

The instant invention, therefore, comprises a cooperative communication system that will permit the transmission of any active "1" bits designated by the location code to the other party equipped with a decoder for each pixel. Transmission of codes from different pixels to geometrically corresponding pixels at the receiver is simultaneous and only the corresponding pixels respond. This transmission system makes use of certain elements of the cooperative communications system of U.S. Pat. No. 5,029,210.

Thus, for an n element picture, the transmission channel rate is r, rather than rn where r is the required rate of changing the scene sample. Thus, if r=30 scenes per second, the conventional transmission rate is 30×1,000,000=30,000,000 pulses per sec. (one pulse per pixel position), whereas with the new method the transmission channel rate could be 30 pulses per sec, (one pulse per scene), provided that the full potential of the instant invention is achieved. In this invention transmit power increases only linearly with number of pixels (bits) versus exponentially in the case of previously known parallel transmission methods. Limitations of achieving compression on this scale may be imposed by practical considerations such as the achievable tolerance on capacitances used in the system shown in FIGS. 9A and 9B. The results shown in FIGS. 4 and 6 show that significant simultaneous transmission can be achieved by this invention. It should be evident that this method is useful at compression ratios less than the ultimate at a cost of increased transmission bandwidth, i.e., the system is still useful even if we do not compress the bandwidths as low as 60 hz.

Figure 10:
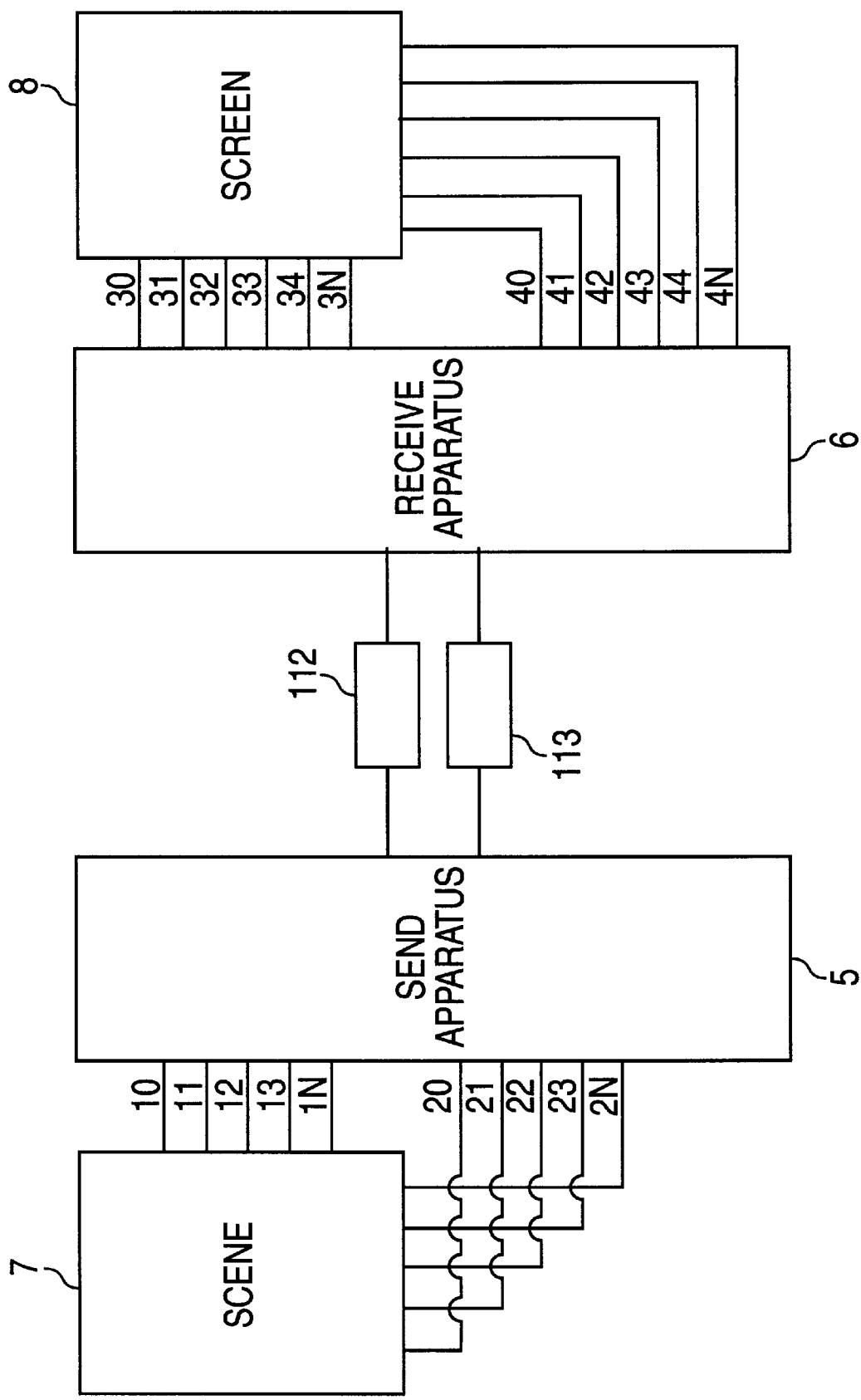
FIG. 10 is an overview of a scanless television system.

Each pixel, which uses a common transmission channel with the other pixels, is connected to the communication system shown in FIG. 10, which includes the new sending and receiving apparatus. This apparatus contains the coding for each pixel and the modulating devices called Switched Inverters. The transmission of energy is dependent on the status of the inverters at the sender terminal. This apparatus allows each receiving pixel to respond only to a transmitting pixel with a corresponding code. If these n codes of length n were to be transmitted simultaneously, as by present means, a common channel bandwidth of n×(1/t) is required, where t is the time required by the change of information in the scene, resulting in no bandwidth savings. However, most significantly, the present invention provides a method which reduces the bandwidth requirement to 1/t.

Each transmitter bit location (pixel) is linked to a corresponding bit location in the transmitter, via a common pair of transmission paths, allowing energy to pass from the transmitting point to the receiving location and from the receiving point to the transmitting location.

Energy build-up will be suppressed whenever the codes are not corresponding. Individual bit locations at the receiver individually and separately detect the presence of a corresponding code of a corresponding bit location at the transmitter. (As mentioned before, the bit locations are connected to illuminated points on the scene in the TV camera and in the receiver to individual light generating points of the TV screen. In general, however, these bit locations may be digit positions stored on shift registers or other accessible bit storage locations). Energy will not build sufficiently to be detected if the receive and transmit codes do not match, so that only complementary received bit positions will detect corresponding transmitted ones.

The amplitude of energy in the common channel transmission link flowing from transmitter to receiver and receiver to transmitter will increase with the number of simultaneously energized pixels (or bit locations registering "1" bits), but the bandwidth will remain fixed and controlled by the narrow band filter.

A receive bit location will not register a bit "1" if the corresponding transmit bit location is not actively transmitting a bit. Other transmit bits will cause energy voltage to be present on the common transmission link, but will not energize inactive pixel locations because of operation of the branch codes as discussed previously. Thus, interference among the bit locations is eliminated.

Although the transmission system of the present invention may operate half duplex, the use of the return channel shown in FIGS. 9 and 10 greatly improves the noise immunity of the system. FIGS. 4 and 6 were generated by a uniform band of signal inputs such as band limited white noise. However, regenerative loop feedback, as taught in U.S. Pat. No, 5,029,210, will cause the spectral outputs of FIG. 6 to change to line spectra. This effect is aided by providing limiters in each receiver branch and loop gain greater than unity. This method causes the strongest signals to grow and inhibits the weaker signals generated by the recirculating circuits. This suppresses the noise relative to the desired signals, thus reducing the required transmit power and error rate significantly, as well as allowing closer spacing between bit frequency positions which further improves the bandwidth compression.

It is, therefore, seen that the present invention can transmit a simultaneously available ensemble of information over a narrow band channel, the bandwidth of which is determined only by the rate of time change of the entire ensemble of transmitted bits. In the case of TV or motion video, this rate of change is determined primarily by the persistence of vision. It may also be determined by motion within the scene. Sending only changes in individual bit locations will reduce the number of simultaneously transmitted bits in the ensemble. This effect may be used to reduce the transmit rate and bandwidth further.

The reduction in bandwidth requirement also reduces the transmit power requirement in proportion to bandwidth where the signals compete with noise. This power reduction is significant.

Referring again to FIG. 10, item 5 is the inventive sending apparatus for transmission of scene material item 7. Item 6 is the inventive receiving apparatus for converting the transmitted information to usable information for the receiving screen. Scene 7 may be made up of individual pixels lined up in rows and columns. These pixels are light sensitive and may be sensitive to specific colors. Each pixel is individually applied to the sending apparatus via lines 10 through 1N and 20 through 2N. Optionally, each pixel can be connected to the send apparatus 5 via two connections; thus each pixel may be connected by lines 10 and 2N as will be shown in detail later. The use of two connections per pixel can result in a greater saving in the number of individual codes that must be used in the transmission system. The connections 10 through 2N are individually connected to bit generators in the send apparatus, such as 100 and 107 in FIG. 11. The send apparatus is connected to the receive apparatus via transmission link 112. A return link 113 is also used. These links require very small bandwidths. The receive apparatus is connected via its bit receivers such as 119 and 123 in FIG. 12 to the screen. The screen consists of individual points of illumination. The value of illumination of individual pixels is determined by the bit receivers. Again each pixel may be individually connected via lines 30 through 4N, but it may be advantageous to use two connections per pixel, one row connection and one column connection. The row connections are 30 through 3N and column connections are 40 through 4N. Thus, the illumination of a particular pixel is determined by said lines 30 and 40 corresponding to the transmission lines 10 and 20. The illumination of a particular pixel is governed by the use of an AND circuit which logically adds the outputs of 30 and 40.

Figure 11:
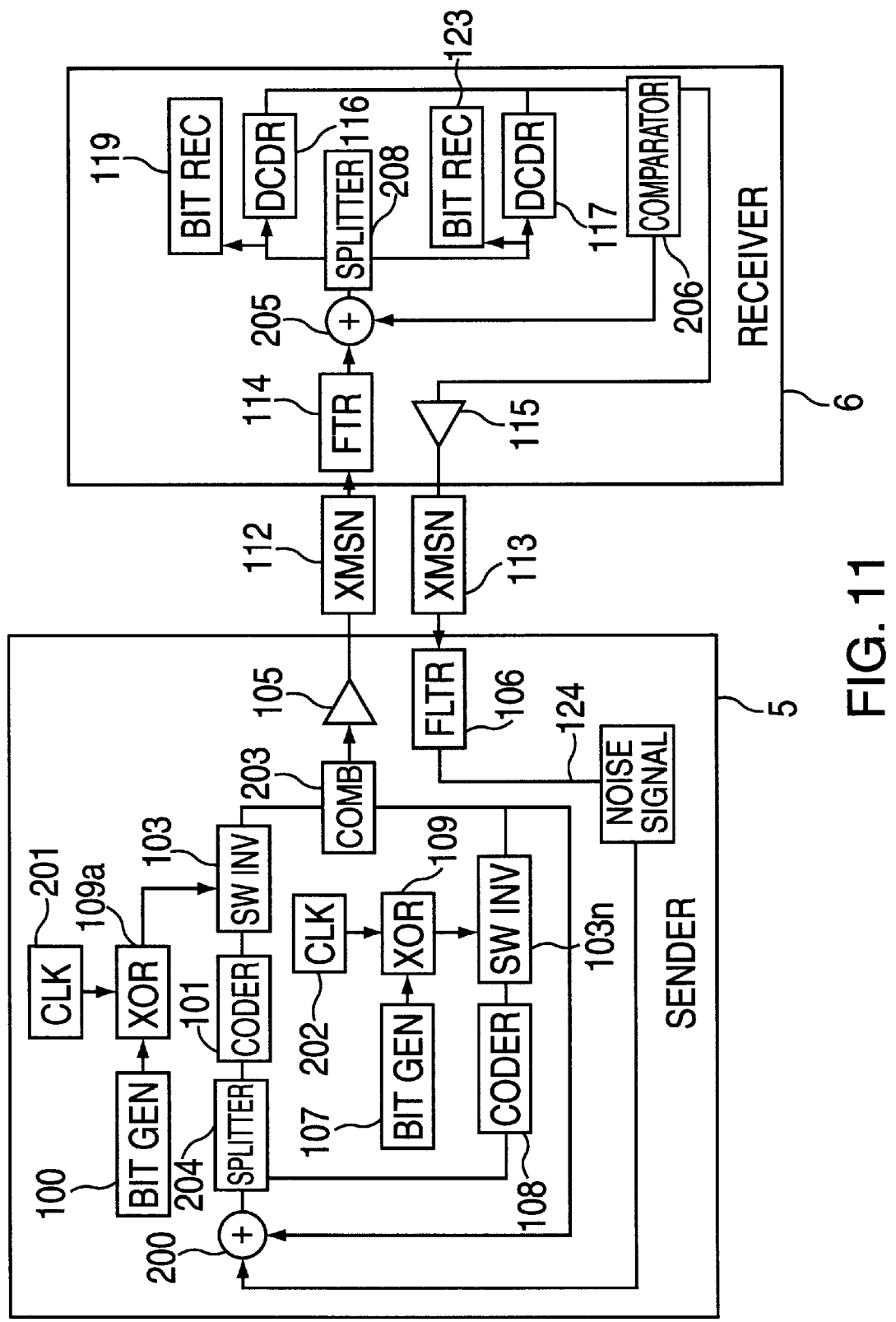
FIG. 11 is a transmission system in accordance with the instant invention.

The understanding of the transmission system for accomplishing the transmission of images from scene 7 to received scene 8 requires the use of FIG. 11 which details the transmission system. Each pixel of the sending unit is connected to a bit generator such as number 100 shown in FIG. 11, Thus, the system is specifically useful for transmitting digital information or information in binary form. When the pixels are not in digital form, it will be necessary to convert those pixel values into binary form. One approach to this would be to send the gray scale information in the form of bit planes. Bit planes are scenes containing bits of a common value or level of significance. Thus, gray scale could require 4 bits which can be transmitted separately and successively, one bit plane at a time. This will cause a bandwidth increase by a factor of 4, or an increase from 30 to 120 hertz, for example.

Bit Generator 100 transmits bits when they are present to XOR unit 109a. Clock 201 mixes with this signal in XOR unit 109a and the output controls the switched invertor 103. The operation of 103 is to provide an inversion of phase (a shift of 180 degrees) when it is switched from one position to the other. Invertor 103 has only these two operating positions. This inversion is provided by switching in or out one stage of amplification as described in U.S. Pat. No. 5,029,210.

Switched inverter 103 operates in a loop consisting of 103, coder 101, combiner 203, adder 200, and splitter 204. Coder 101 consists of a series resonant circuit which provides an incremental phase shift for each of n intervals per bit interval. Clock 201 controls the switched invertor 103 which controls the loop so that n recirculations occur for every bit interval. n depends on the compression ratio, which could possibly be as high as 1,000,000 if all the pixels are sent simultaneously and minimum bandwidth achieved.

Another pixel will energize bit generator 107 when it is suitably illuminated or activated. The operation of this channel is entirely similar to the operation of the channels connected to bit generator 100, however, coder 108 has a different incremental phase shift than that of 101 and corresponds to the code contained in decoder 117. Once again, the activated bit generator mixes with the clock 202 in XOR unit 109n which controls switched invertor 103n, which is part of the loop containing coder 108 switched invertor 103n, combiner 203, adder 200 and splitter 204. It should be understood that the combiners, splitters and adders are linear operators.

The output of the combiner 203 feeds the forward transmission link 112 which transmits the sum of all the branches of the sender (transmitter) only two of which are shown. The combiner also supplies a feedback path to the adder (summer) 200, which enables the incremental operation of the sender as described previously (FIG. 3B). Filter 114 represents the narrow bandwidth of the channel through which all the sender signals must pass. In the receiver unit 6, decoder 116 has the same incremental phase shift as coder 101, and decoder 117 has the corresponding incremental phase shift as coder 108. These differing incremental phase shifts constitute the branch codes which are used to separate the transmitted bits at the receiver at a specific sampling time at the end of interval nT. This detection is done at the bit receivers 119 and 123 for example. Decoder 116, combiner 206, adder 205 and splitter 208 form a loop which is only responsive to coder 101, and the loop containing decoder 117 is only responsive to coder 108. The loop operates in similar fashion to the transmitter loops and as discussed in connection with FIG. 5.

The output of the receiver combiner 206 may be fed back to the sender via link 113 to reinforce the signals 124, which are the input to the sender. This benefit has been discussed previously. Otherwise the system may be operated half duplex by the bandlimited noise from the sender input, or by synthesized cw signals.

This means that operation of any of the pixels, two of which are shown in FIG. 11, uses a common transmission path and requires exactly the same narrow bandwidth primarily determined by the change of scene (or bit ensemble) requirement. It should be noted that if it is useful to send only changes in the pixels which may change less frequently than the persistence of vision, it would be possible to further narrow the bandwidth of transmission link 112 and 113. This requires modification of the bit generator to provide the change transmission capability. Modification of the bit receivers is required to modify pixel value when changes are received.

FIG. 12 can be used to follow the operation of the transmission system shown in FIG. 11. FIG. 12, column 1, indicates the value of the bit being transmitted either "1" or "0"), column 2 indicates the arbitrarily chosen number of the pixel position, column 3 shows the transmit code, column 4 shows the transmitted bit waveform, column 5 shows the resulting state of the transmission switched invertor as to whether it is in an inverting ("1") or a non-inverting ("0") state. When in the inverting state a block is shown (no transmission); when it is in a non-inverting state no block (transmission) is shown. Column 6 shows the transmitted waveform on the transmission link 112 (FIG. 11). Column 7 shows the received wave shape at the detector of the corresponding branch of the receiver. Column 8 shows the reception of a bit wave form (a "1") or a non-reception ("0"). Non-reception is shown by a line indicating zero energy. Note that the actual bit reception occurs after the received wave shape reaches threshold. Finally, in column 9 is shown the state of feedback transmission line 113 in FIG. 11.

The first row represents the transmission from pixel 1. In this case pixel 1 has a transmission code of differential phase shift of $\Delta\phi_1$ responsive to input frequency $f_1$ as shown in column 3. The data bit (a "1") to be transmitted is shown in column 3 and results in the transmit switched invertor (item 103) in FIG. 11 to be in the non-invert (0° phase shift) state. The corresponding receive pixel position in FIG. 11 has a corresponding code in decoder 116 as shown in column 7 and the bit receiver 119 will receive an amplitude designating receipt of a "1" Bit, as shown in column 8. There will be an amplitude on the transmission channel with wave shape and frequency as shown at column 6.

Pixel 2 has a different code of differential phase shift $\Delta\phi_2$ to that used in Pixel 1 and which is responsive to input frequency $f_2$. As shown in column 2 a "1" bit is being transmitted by setting the switched invertor 103n to 0° and together with the code of column 3 produces the transmitted pattern in column 6. This results in the received pattern of column 7 causing a "1" bit to be present at pixel 2 as shown in column 8. There will be an amplitude on the transmission link as shown in column 6. If both pixels 1 and 2 are active the amplitude on the transmission line will rise to the sum of the powers of the two.

Rows 3 and 4 shows the operation when "0" bits are sent from pixels 1 and 2. The transmit codes shown in column 3 are the same as before. The transmit bits in both pixel branches cause the switched inverters to invert phase (add a 180° phase shift) which causes cancellation of signals in the sender loop. This results in no amplitude on the transmission line (column 6) and in "0" bits being received as shown in columns 7 and 8.

Rows 5 and 6 show the case when the pixels send different bits. Each receive pixel receives its corresponding pixel value, but the amplitude of the transmission line can only rise to the value caused by one active pixel. Note that the received bit level of pixel 1 is zero corresponding to the transmitted level despite the presence of amplitude on the transmission line. This is a result of the action of the receive decoder 106 which is not responsive to frequency $f_2$ and frequency $f_1$ is not transmitted because of the phase inversion introduced by invertor 103 (column 5). This receive bit level will be zero at the end of the bit interval.

Rows 7 through 10 show the operation for a group of Pixels, in this case three sending "1" 's and one sending "0". This is the case also shown in FIG. 6. This case is important because it shows that the "0" will be received in spite of a large number of "1"'s which send energy. The codes for each pixel are different phase shifts $\Delta\phi_i$ which respond only to specific input frequencies $f_i$ and are inhibited in the case of a "0" bit by introducing phase inversions (column 5 row 8). The "1" 's are transmitted by wave forms of slightly different frequencies which rise gradually during the bit interval and are decoded at the correct receiver pixel branches (column 7) to deliver the "1" bits without affecting the "0" bit. The power on the transmit channel will be the sum of the active bits.

Figure 13:
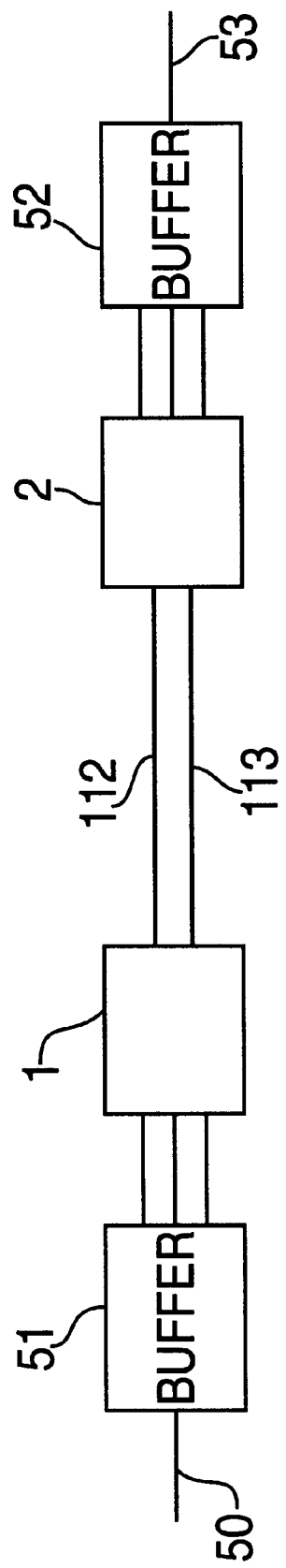
FIG. 13 is a diagram of the inventive system used for reduced bandwidth digital transmission.

The same transmission system used for implementing the scanless TV system can be used for reducing the bandwidth requirement of a digital transmission system for a given information rate. In this case as shown in FIG. 13 the TV system is replaced by transmission buffers 51 and 52. Buffer 51 receives serial digital transmission information from transmission line 50 and buffer 51 delivers information to serial transmission line 53. The buffer 51 feeds parallel information into transmitting apparatus 1. The parallel information bits are the same as pixels in the previous description which are fed into the bit generators which provide input to the switched inverters. The n parallel bits are transmitted via the common channels 112 and 113 to the receiving apparatus 2, which conveys the reception to parallel bit positions of the buffer 52—every t seconds.

The buffer is serially read out by a local clock. The buffers contain an intermediate storage area so that new data can be received while the data received at the end of the previous t second interval is being clocked out.

This procedure allows the bit rate of the transmission line's 112, 113 to be 1/n of the bit rate of lines 50 and 53, where n is the number of parallel bit positions buffered. Thus, if the data rate of the original lines is 100,000 bits and n is 100, the effective bit rate of the transmission lines 112 and 113 is 1,000 bits per second. Thus, digital voice may easily be transmitted on narrow band voice frequency channels. T-1 channel operating at 1;544 MBPS may also operate over a narrow band voice frequency line if n=1500.

Storage Buffers as shown in FIG. 13 for digital transmission may be used to send combined sound and video in the same apparatus. If the video requires C=2,000 codes, for b=2, additional codes may be added for the sound. If digital sound at the rate 100,000 bits per second accompanies the video, and the picture delivery rate is 100 frames per sec, then 1,000 bits of sound may be transmitted simultaneously per frame by the use of $C=2(1,000)^{1/2}=66$ additional codes to the 2,000 codes used for video.

Very few restrictions are placed on the transmission link 112 and 113. The common channel transmission may be translated to any suitable frequency by mixing with an oscillation on transmission and down converting the signal at the receiving end. Both 112 and 113 may be handled in the same fashion. The mixed oscillations may be used for selective addressing. Both wired or wireless facilities may be used.

The system may also operate directly with a retrodirective oscillation loop so as to provide automatic directivity as taught in U.S. Pat. No. 3,757,335, as well as increased transmission capacity.

Pixel is literally picture element. It represents a location in an array that defines a scene or image. At such location, there may be varying information such as gray scale (luminance), hue and tint. This information requires varying numbers of bits so that in general the total number of bits will be a multiple of the number of pixel locations.

We shall assume whenever multiple bits are located at a pixel, that pixel will be replaced by multiple elemental pixels comprising one bit each. These can be readily handled by the compressive transmission system because it only means a multiplication of the number of parallel bits to be transmitted, and a greater demand for compression for a given required bandwidth. For example, if a pixel provides 12 bits of information for luminance, hue and text, and there are 500×500 or 250,000 pixel locations, then 12×250,000= 3,000,000 bits are required to totally describe the scene every 1/30 of a second. This results in 90,000 bits per second as the transmission requirement. The inventive compression system would be required to compress the 3,000,000 elemental pixels into one channel each 1/30 of a second. The receiver is equipped with logic to reconstruct the final pixel luminance tint and hue and correct pixel location from these elemental pixels (bits).

It is to be understood that if the number of codes is equal to the number of pixels (or parallel bits to be sent), the transmission link will transfer each pixel independently since there are n independently controlled paths. The number of codes required for a given scene (or ensemble) of n pixels (or store of n bits) is reduced by the use of multiple codes per pixel, but at the expense of possible process errors depending upon the source.

In the two dimensional case we designate each pixel position by two codes $C_x$ and $C_y$. which correspond to an x and y coordinate respectively, then the number of $C_x$ and $C_y$ codes will each be $\sqrt{n}$ for a square image, so that for $n=10^6$ there will be 1000 $C_x$ and 1000 $C_y$ codes.

Figure 14:
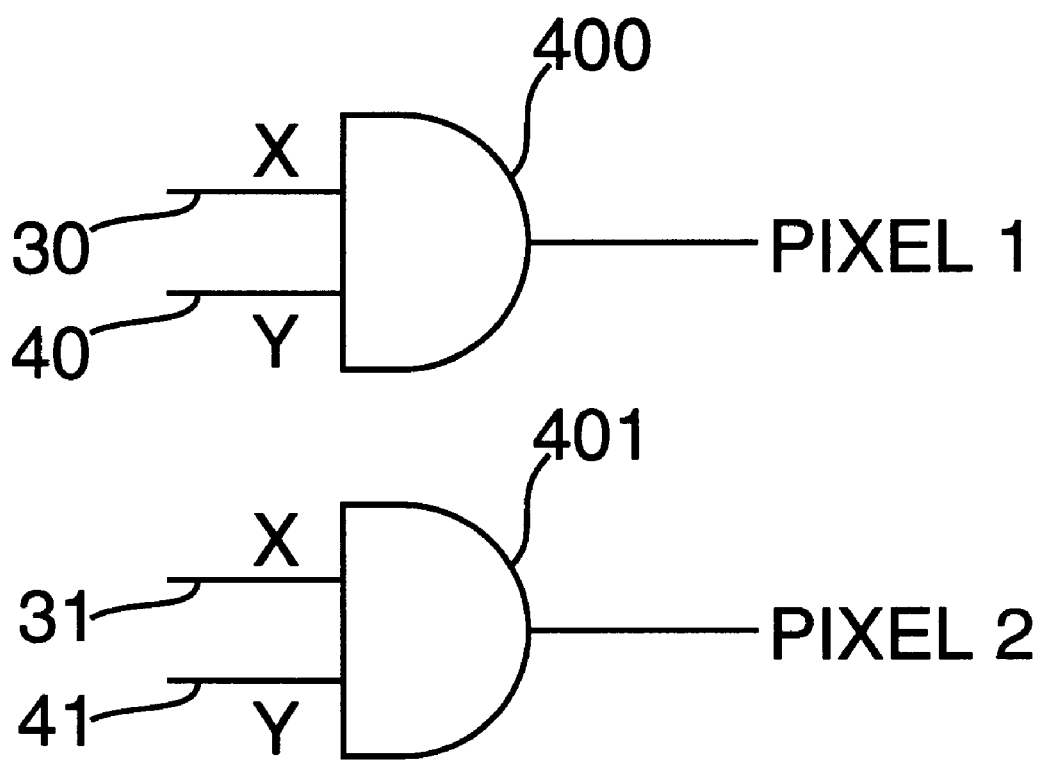
FIG. 14 shows the AND Combination of received bits when two codes per bit position are used.

Each receive pixel must now be equipped with AND logic as shown in FIG. 14. The AND circuit must receive an x 30, 31 and y 40, 41 code; such as, $C_{x1}$ and $C_{y1}$. There is, however, the possibility of generating false received pixels if two are being transmitted at the same time.

Figure 14A:
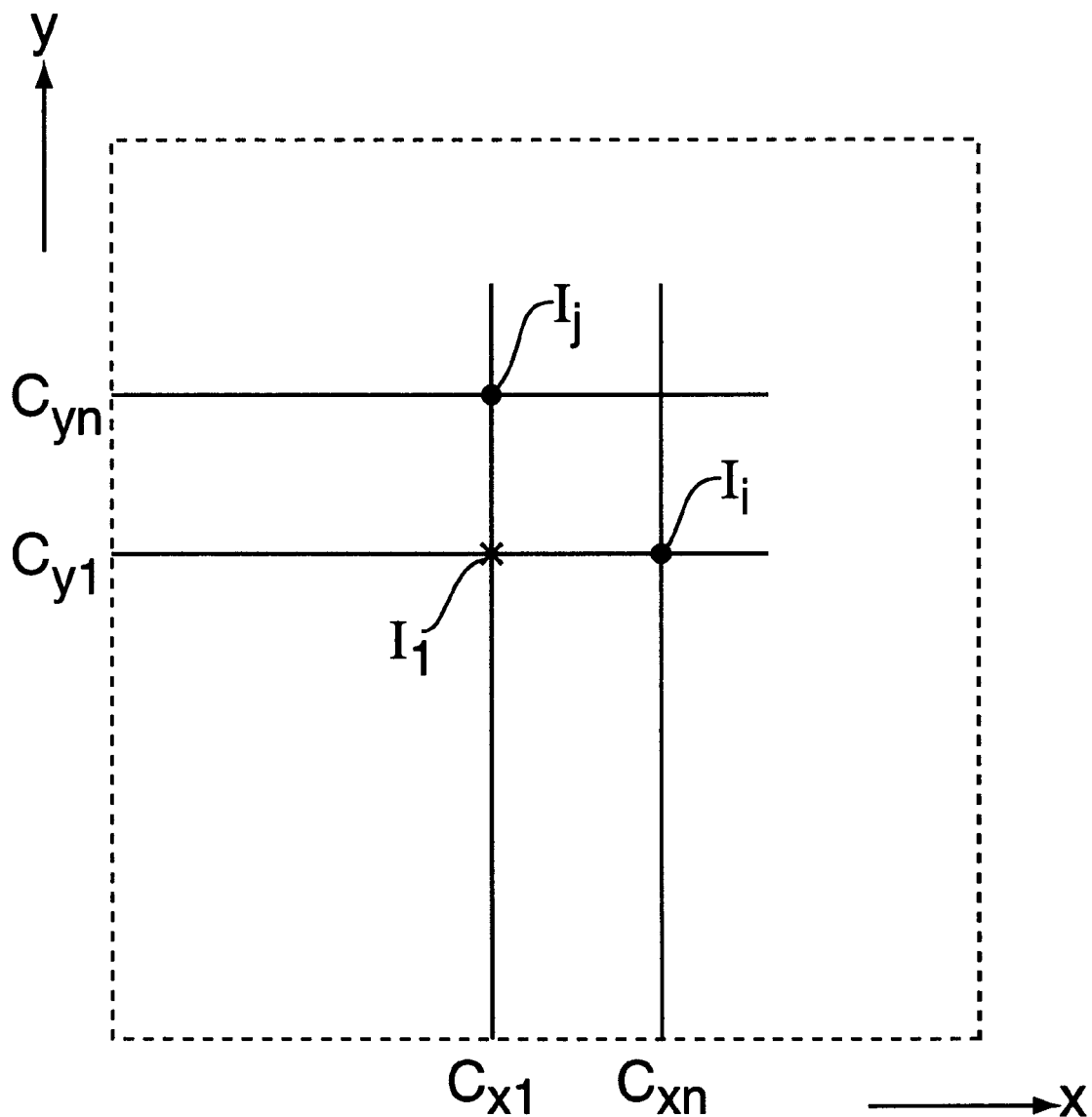
FIG. 14A shows possible false responses to AND Logic.

Referring now to FIG. 14A, suppose pixels $I_i$ and $I_j$ are simultaneously transmitted. Then the code for $I_i$ is $C_{xn}C_{y1}$ and that for $I_j$ is $C_{x1}C_{yn}$. Part of these codes, i.e.; $C_{x1}$ and $C_{y1}$ can activate pixel $I_1$, since that pixel is equipped to receive these codes and enable the appropriate AND circuits.

Such false responses are obviated by adding a unique identifying code, $I_n$, for each pixel. For $n=10^6$, the length of the $I_n$ codes is 20 bits. By sending 20 bits per $C_x$ and $C_y$ code the false response may be eliminated. The total number of code bits required to do this for $n=10_6$ is:

$C_x I_n = 1000 \times 20 = 20000$
$C_y I_n = 1000 \times 20 = \underline{20000}$
$40000$ These 40000 code bits will represent the positions of the 1,000,000 pixels in the scene. This represents a code compression of 25 for $n=10^6$. It can be shown by similar computation that the compression ratio for $n=10^8$ is approximately 200.

The transmitted pixel $I_1$ energizes $C_{x1}I_1$, and $C_{y1}I_1$. The pixel $I_1$ is, in expanded form, $I_{11}, I_{12}, I_{13} \ldots I_{1n}$ which represents the bit sequence of the identifying code. The length of this code is $b=\log_2 n$. The transmitter ANDs each of the bits of this sequence with the $C_{x1}$ and the $C_{y1}$ codes. What is used for transmission for pixel 1 is $C_{x1}\&I_{11}$, $C_{x1}\&I_{12}, C_x\&I_{13} \ldots C_{x1}\&I_{1n}$ and $C_{y1}\&I_{11}, C_{y1}\&I_{12}$, $C_{y1}\&I_{13} \ldots C_{y1}\&I_{1n}$, where & stands for the AND function. A separate transmit code is required for each of these components. Each of the n pixels are similarly treated. The resulting 40,000 codes each require a length of 40,000 "chips", a great reduction in code length from the 1,000,000 chips when each pixel is sent separately and no dimensional coding is used.

Figure 14B:
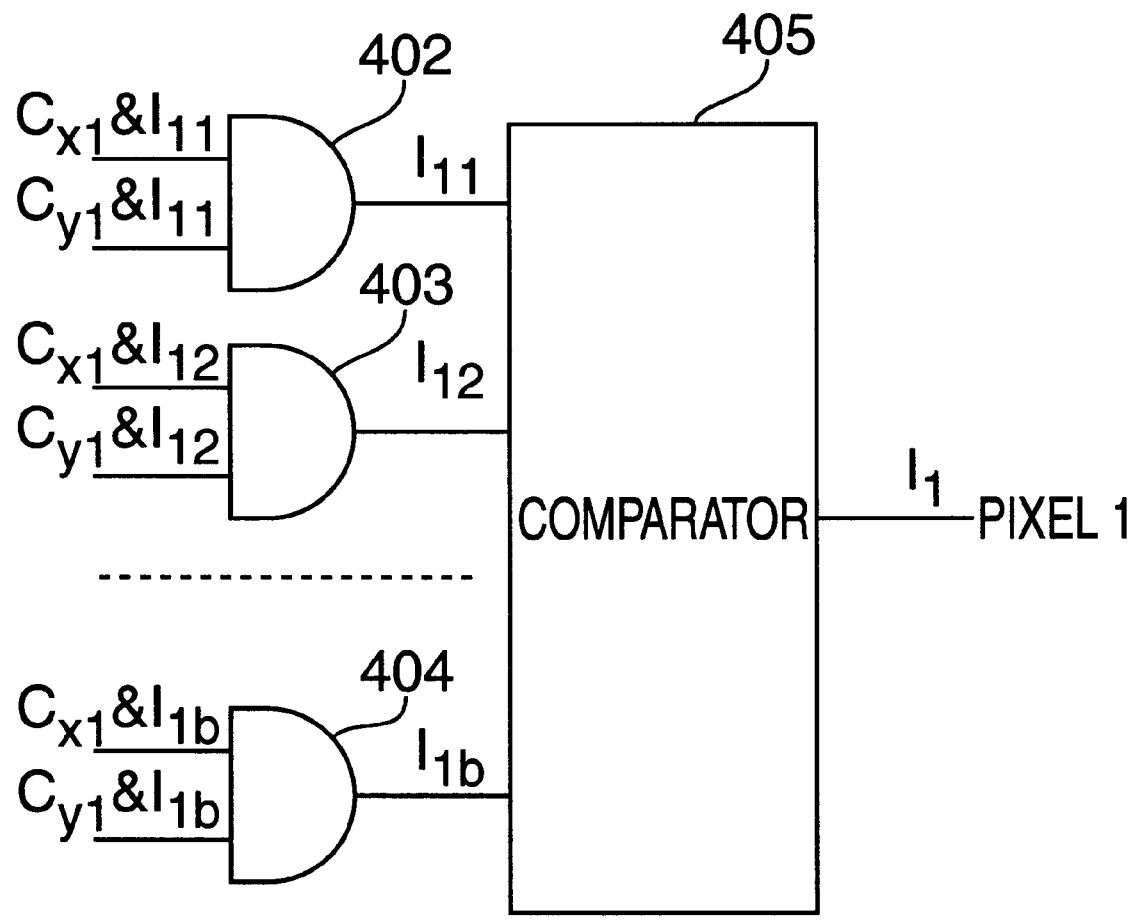
FIG. 14B shows the two dimensional receive logic in accordance with the invention.

FIG. 14B shows the logical structure used to receive a given active pixel. A multiple AND circuit is setup at the receive pixel $I_1$, location. The AND circuits 402, 403, . . . 404 are first used to derive the identifying codes $I_1=I_{11}$, $I_{12} \ldots I_{1b}$, where $b=\log_2 n$, by ANDing the $C_x\&I_1$ and $C_y\&I_1$ bits for pixel 1 as shown in FIG. 14B. These bits are conveyed to the receiver by the coded loop signals as shown in FIGS. 10 and 11. These AND circuits are connected only to the bit outputs for the particular pixel to be received. There are b x inputs and b y inputs (b=20 for $n=10^6$) from which are derived the b identifying codes $IL_{11}, \ldots I_{1b}$. Comparator 405 will provide an output only when the b inputs are all "1"s. Pixel 1 will only be activated when the unique set of codes has been received.

The number and length of the codes used for transmission can be reduced further by binary encoding the x and y codes of each pixel. In contrast to the previous method show in FIG. 14B, the pixel locations are represented by binary code groups, each bit of which is conveyed by a separate loop. Fewer codes are required because several bits are sent simultaneously. The method requires $b=\log_2 n$ $C_x$ codes and $b=\log_2 n$ $C_y$ codes so that the receiver will receive the proper coincidence of "1" bits to denote reception of active pixels ("0" bits do not operate the system). Each of the bits in the binary representation must be ANDed with the identifying bits as before.

Thus, for example, location 1 in FIG. 14C, where n=16, is represented by $C_{x1}C_{y1}C_{x3}C_{y3}$ and:

location 5 by $C_{x1}C_{y1}C_{x3}C_{y4}$
location 9 by $C_{x1}C_{y2}C_{x3}C_{y3}$
location 13 by $C_{x1}C_{y2}C_{x3}C_{y4}$ and so forth. The identifying codes for these locations are:

location 1 $I_{11}I_{12}I_{13}I_{14}$
location 2 $I_{21}I_{22}I_{23}I_{24}$
location 3 $I_{31}I_{32}I_{33}I_{34}$
location 4 $I_{41}I_{42}I_{43}I_{44}$ and so forth. The total code for pixel location 1 for n=16 is, for example,:

$C_{x1}\&I_{11}, C_{x1}\&I_{12}, C_{x1}\&I_{13}, C_{x1}\&I_{14}$,
$C_{y1}\&I_{11}, C_{y1}\&I_{12}, C_{y1}\&I_{13}, C_{y1}\&I_{14}$,
$C_{x3}\&I_{11}, C_{x3}\&I_{12}, C_{x3}\&I_{13}, C_{x3}\&I_{14}$,
$C_{y3}\&I_{11}, C_{y3}\&I_{12}, C_{y3}\&I_{13}, C_{y3}\&I_{14}$

For location 1 the identification bits $I=I_{11} \ldots I_{14}$ are 0001. Therefore the binary representation of this code is $C_{x1}\&I$ $C_{y1}\&I$ $C_{x2}\&I$ $C_{y2}\&I$ $C_{x3}\&I$ $C_{y3}\&I$ $C_{x4}\&I$ $C_{y4}\&I$
0001 0001 0000 0000 0001 0001 0000 0000 because $C_{x1}$ and $C_{y1}$, and $C_{x3}$ and $C_{y3}$, are "1" (present), and $C_{x2}, C_{y2}$ and $C_{x4}, C_{y4}$ are 0. The total code length in this case is 32.

Figure 14D:
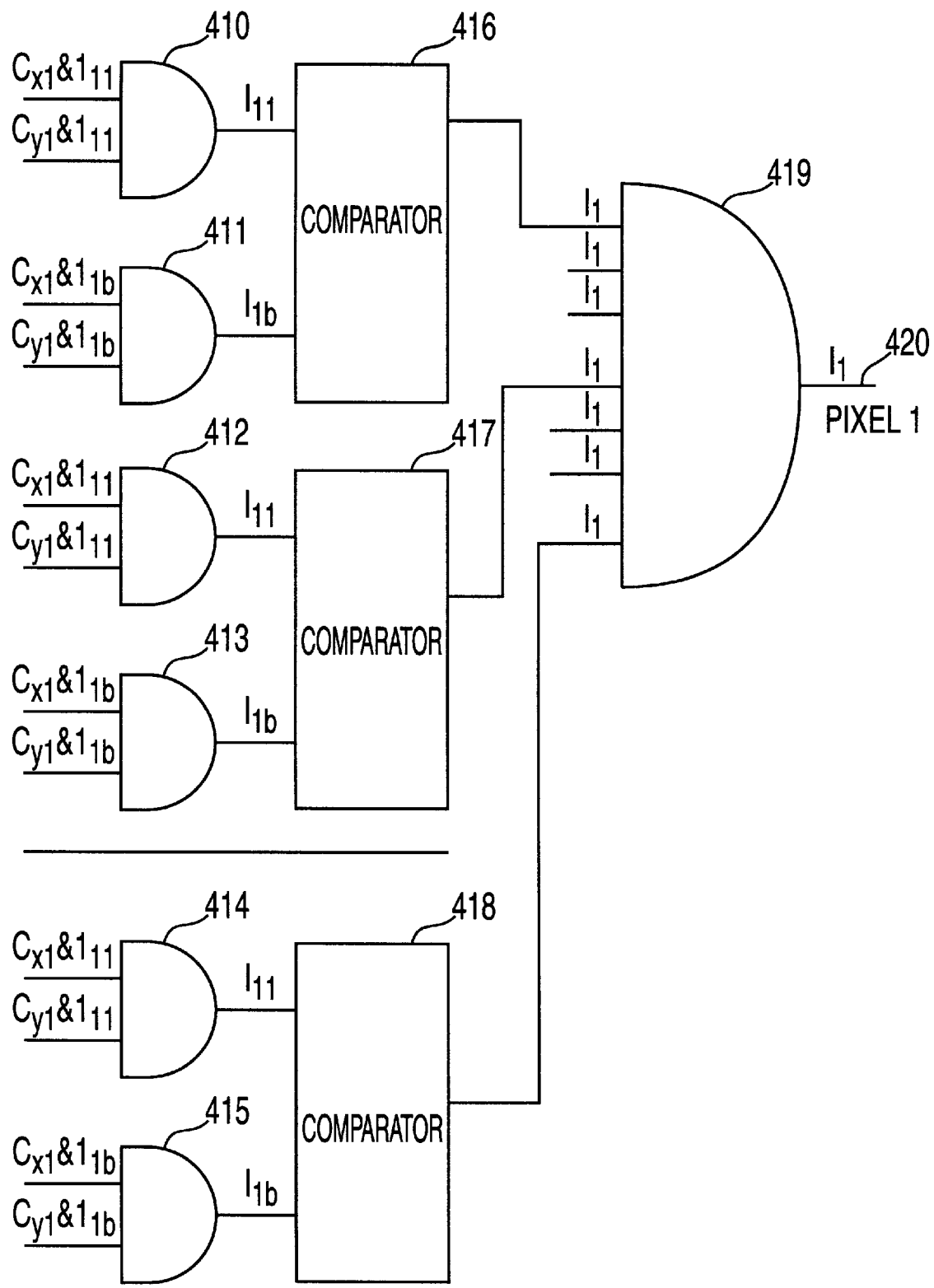
FIG. 14D shows the receive logic for binary coded two dimensional coding.

The way the receiver uniquely responds to the transmitted pixel is shown in FIG. 14D. Each pixel location has multiple AND circuits that allow only the exact correct combination of signals to energize it. FIG. 14D shows the case of pixel 1, which is typical. AND circuits 410, 411, 412, 413, 414, 415 derive the identifying bits from the $C_x\&I$ and $C_y\&I$ codes. b "$C_{x1}\&I$" and b "$C_{y1}\&I$" codes produce b identifying codes $I_{11} \ldots I_{1b}$. Comparator 416 provides an output "1" when this identifying code is received. Comparator 417 does the same thing for $C_{x3}\&I$ and $C_{y3}\&I$ and Comparator 418 derives the b identifying bits $I_{11} \ldots I_{1b}$ for the $C_{xb-1}$ and $C_{yb-1}$ components. There are $b^2$ $C_x\&I$ and $b^2$ $C_y\&I$ input bits available to all pixels. The circuit logic in FIG. 14B will ignore any other set of bits than those identified for Pixel 1. Therefore, multiple pixels may be transmitted simultaneously with this code. At most only one half of the input bits will be connected to any one pixel, which is why the highest level location bit for Pixel 1 is $C_{xb-1}$ instead of $C_{xb}$. The maximum number of AND circuits per pixel is $b^2/2$. In actuality the number of connections made to most pixels is very much lower because the number of "1"s in most of the I codes is very low. For example, For pixels 1,2, 4, 8, 16, the I code contains only one "1", so only b/2 AND units are required for them. Therefore, only a small fraction of the maximum number will be required on average. The number of comparators is b/2. The final AND circuit 419 which provides the pixel output when the correct input is received requires b/2 inputs. These circuits can readily be manufactured in the form of integrated circuit technology.

The usefulness of this logic for reducing codes and providing information compression useful for data storage becomes more apparent for larger values of n; i.e. n>256.

Figure 14E:
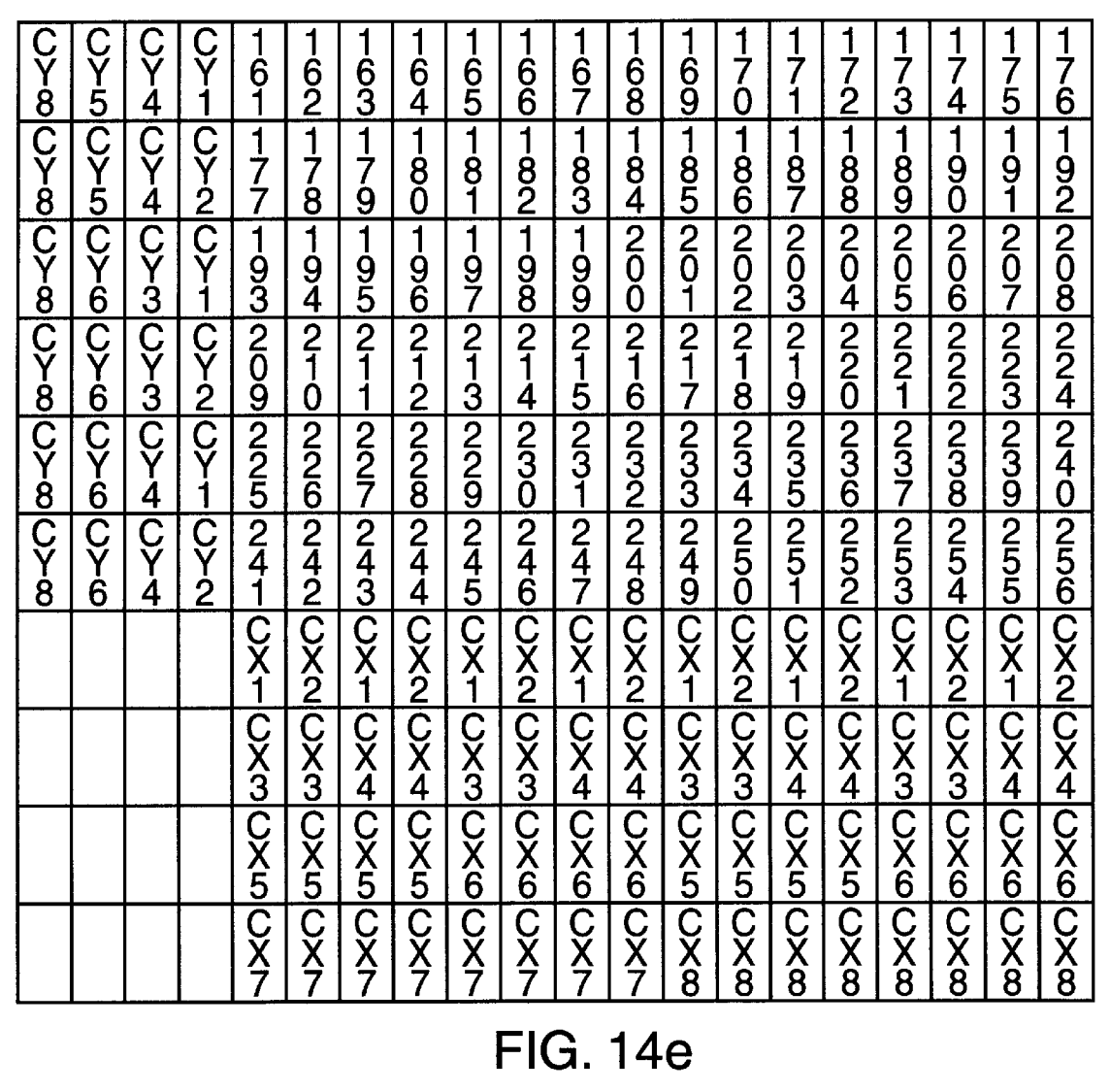

FIG. 14E shows the coding for this case. The identification bits that are required are 8 bits long. Eight Cx and eight Cy bits are needed for a total of 8×8+8×8=128 bits to represent 256 bits. To extend the method to n pixels requires:

$(\log_2 n)^2$ $C_x\&I$ codes and
$(\log_2 n)^2$ $C_y\&I$ codes or a total of
$2(\log_2 n)^2$ C&I codes, where $\log_2 n = b$. For $n=10^6$, or $2^{20}$, b=20 and the number of codes required is 2×20×20=800. For $n=10^8$, or $2^{24}$, the number of codes is 2×24×24=1152. The data compression ratios are $10^6/800=1250$ and $10^8/1152=86,806$ respectively. It should be noted that all of these compression ratios of the multi dimensional method are achieved at the possible expense of errors depending on the source.

Figure 14F:
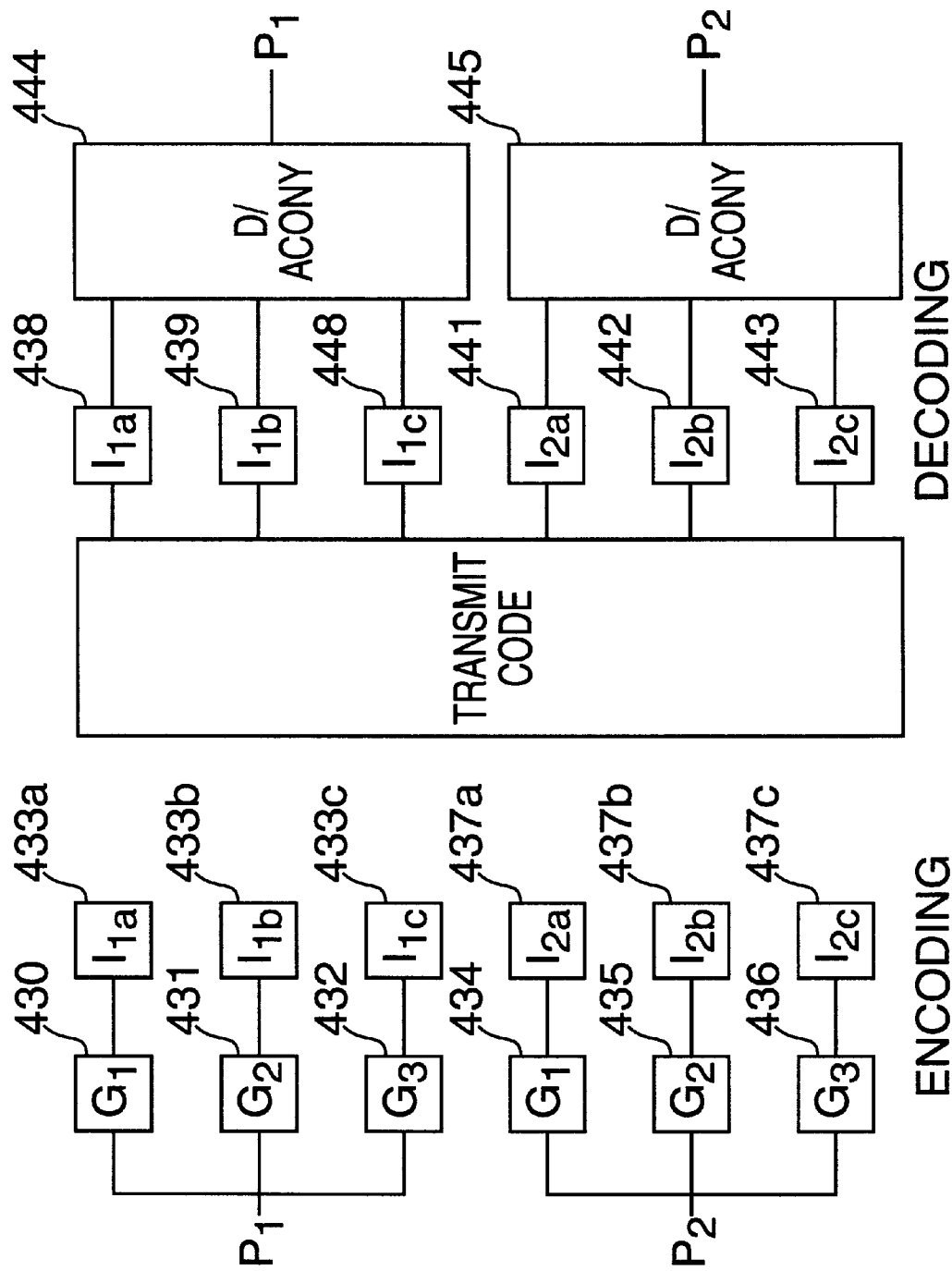
FIG. 14F shows a method of encoding gray scale and other attributes.

The code word can also be extended to include specification of gray scale, color and other attributes of a given pixel location. This is done by assigning additional identification codes to a pixel input,so that a pixel may have access to three, four or more identification codes. Gray tone or scale may be represented by three or four or more bits to represent 8, 16 or more levels. Tint and hue may also be denoted by additional bits. (The procedure is similar for those attributes.) Each of the gray scale bits controls a separate ID code as shown in FIG. 14F. For pixel 1 gray scale bits 430, 431, 432 control the sending of I codes $I_{1a}, I_{1b}$, and $I_{1c}$ which are respectively 433*a,b*, and *c*, respectively. Similarly for pixel 2 bits 434, 435, and 436 control $I_{2a}$, $I_{2b}$ and $I_{2c}$, 437*a, b*, and *c*, respectively.

At the decoder the $C_{xb}$&I's and $C_{yb}$&I's of the code sequence 455 are decoded as usual. However the additional bits per pixel are decoded separately; i.e., a separate output at pixel 1 is obtained for $I_{1a}$, $I_{1b}$, and $I_{1c}$ at 438, 439, and 440, and for pixel 2 separate outputs are obtained for $I_{2a}$, $I_{2b}$, and $I_{2c}$ at 441, 442, an 443. The three outputs for pixel 1 are presented to digital to analog converter (D/A converter) 444 which derives the gray scale output for pixel 1. D/A converter 445 uses the separate outputs 441, 442, and 443 to provide the gray scale output for pixel 2.

This method of gray tone or attribute coding increases the total number "virtual" pixels to be encoded by a factor g, so that:

$$n = pg$$

where p is the number of pixel locations and g is the number of gray tone (or attribute) bits and n is the total number of bits to be encoded.

This causes the bit length $b = \log_2 n$ to be longer than that required for the actual number of pixels. Though the code C is longer, the compression is greater because the compression ratio is $$n/2 \ (\log_2 n)^2$$

Another method is to send the gray tones one frame at a time. This way the bandwidth must increase and the compression ratio does not improve.

Figure 1:
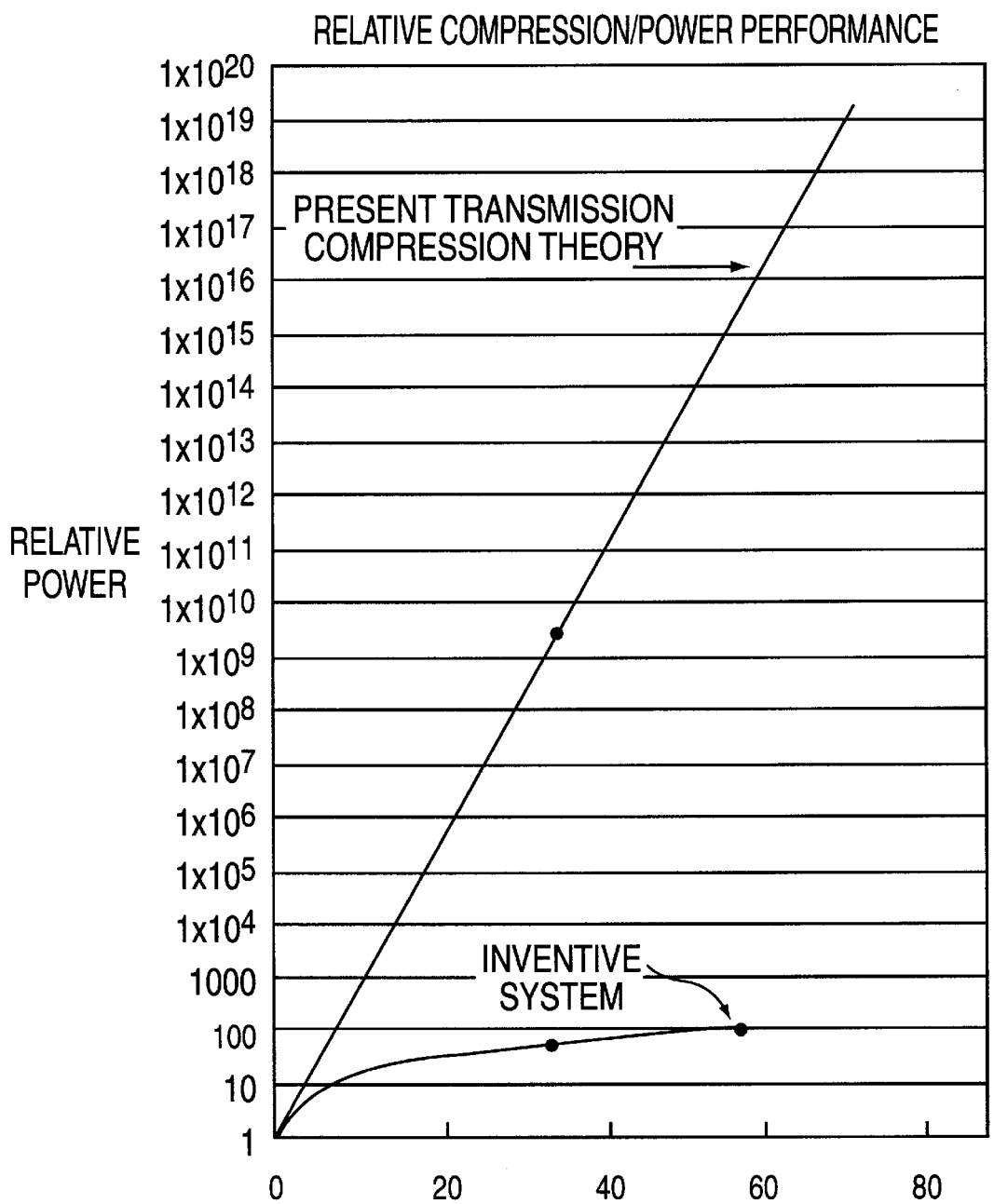
FIG. 1 illustrates the comparative power requirements of a conventional and the inventive system.
Figure 15:
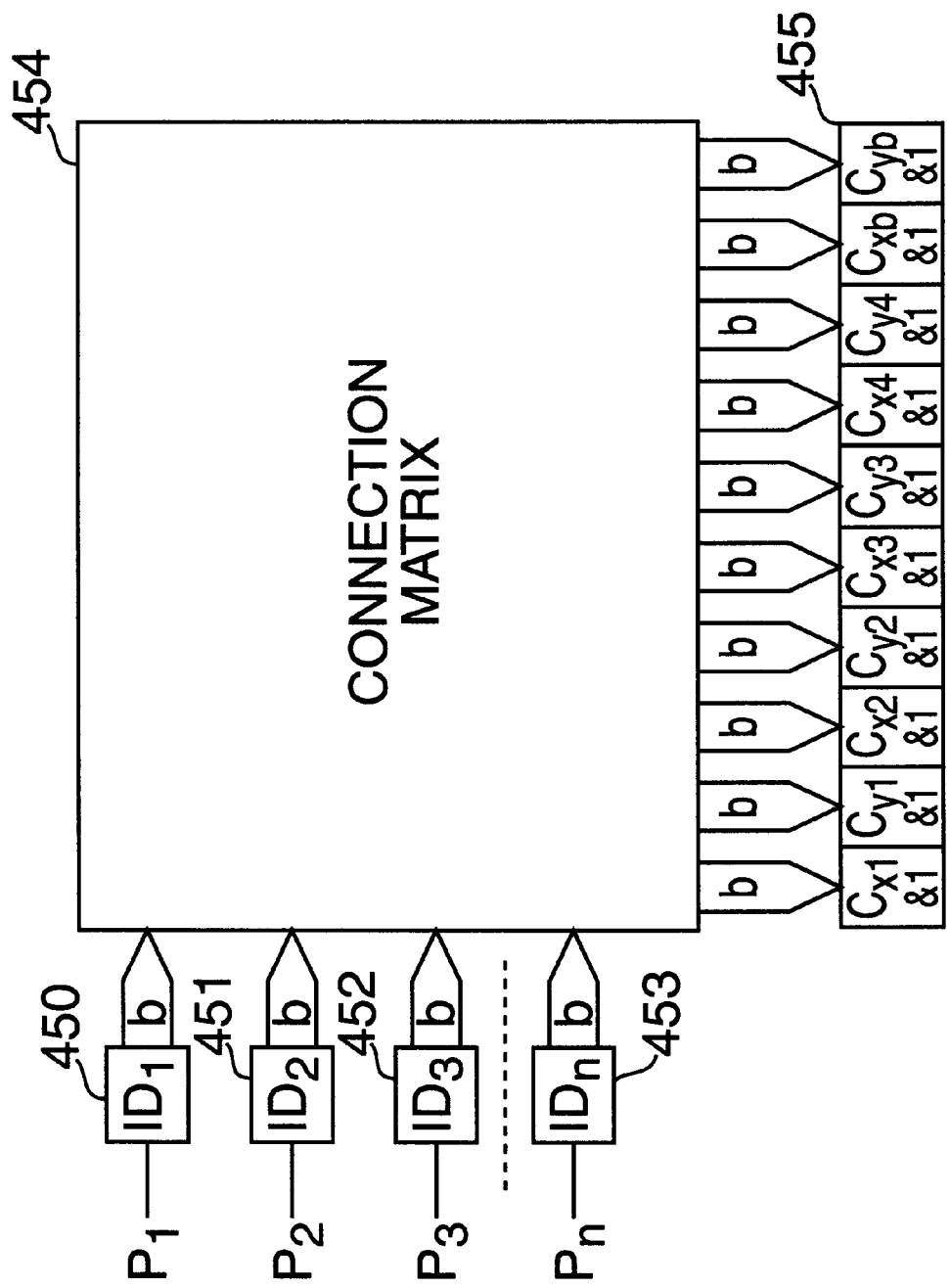
FIG. 15 shows a multidimensional binary encoding system in accordance with the invention.

Referring now to FIG. 1 5, in multidimensional operation transmission codes may be used by several pixels according to the demands of the binary representation of each pixel. As shown in FIG. 15, the pixels first activate the identification coders 450, 451, . . . 453, for each active input. These I codes are $b = \log_2 n$ parallel (simultaneous) bits which feed the connection matrix 454. Individual "I" bits activate several output bits in the connection matrix. The output of this matrix designates code 455 which is comprised of $C_{x1}$&I, $C_{y1}$&I, $C_{x2}$&I, $C_{y2}$&I . . . $C_{xb}$&I, $C_{yb}$&I. This composite code represents one or many or all of the input pixels. A given transmit code bit may be activated by several pixels. The total number of transmit codes of $2b^2$ provides sufficient codes for transmitting all the pixels whether or not all or a few pixels are transmitted simultaneously, because each receiver pixel location is uniquely masked to be responsive to only those multiple groups of codes (bits) which apply to the specific pixel location.

The system previously applied to two dimensional coding can be extended to three dimensions (or higher). The three spatial dimensions are represented by $C_x$&I, $C_y$&I, and $C_z$ codes instead of only $C_x$&I and $C_y$&I codes. The number of I codes is still determined by the total number of pixels, n, but now these are points in three dimensional space, such as, for example points in a cube. The code for a typical pixel such as pixel 1 is:

$C_{x1}\&I_{11}, C_{x1}\&I_{12} \ldots C_{x1}\&I_{1b}$ $C_{y1}\&I_{11}, C_{y1}\&I_{12} \ldots C_{y1}\&I_{1b}$ $C_{z1}\&I_{11}, C_{z1}\&I_{12} \ldots C_{z1}\&I_{1b}$ $C_{x2}\&I_{11}, C_{x2}\&I_{12} \ldots C_{x2}\&I_{1b}$ $C_{y2}\&I_{11}, C_{y2}\&I_{12} \ldots C_{y2}\&I_{1b}$ $C_{z2}\&I_{11}, C_{z2}\&I_{12} \ldots C_{z2}\&I_{1b}$ $C_{xd-1}\&I_{11}, C_{xd-1}\&I_{12} \ldots C_{xd-1}\&I_{1b}$ $C_{yd-1}\&I_{11}, C_{yd-1}\&I_{12} \ldots C_{yd-1}\&I_{1b}$ $C_{zd-1}\&I_{11}, C_{zd-1}\&I_{12} \ldots C_{zd-1}\&I_{1b}$ where $b = \log_2 n$ as before, and $d = \log 2m^2$ and m is the number of pixels per linear dimension. Then $m^2$ is the number of pixels per face of a cube. The coding is done for d sets of components, but pixel 1 is odd and the highest code for odd pixels is $C_{yd-1}$. Note that d<b and $C_{yb}$ is the highest code for the two dimensional case.

The total number of codes for three dimensions is:

$$2 \ (\log_2 n)^2$$

which is the same for the same number of pixels as for two dimensions. As m is the number of pixels per dimension, then $n = m^3$ for the three dimensional case, but $n = m^2$ for two dimensions. This shows that for the same linear dimensions the three dimensional case has far more pixels (bit locations). This is an important consideration when the system is used for compressed data storage. Also there are fewer coding operations for a given number of pixels for the three dimensional case because d<b.

Figure 16A:
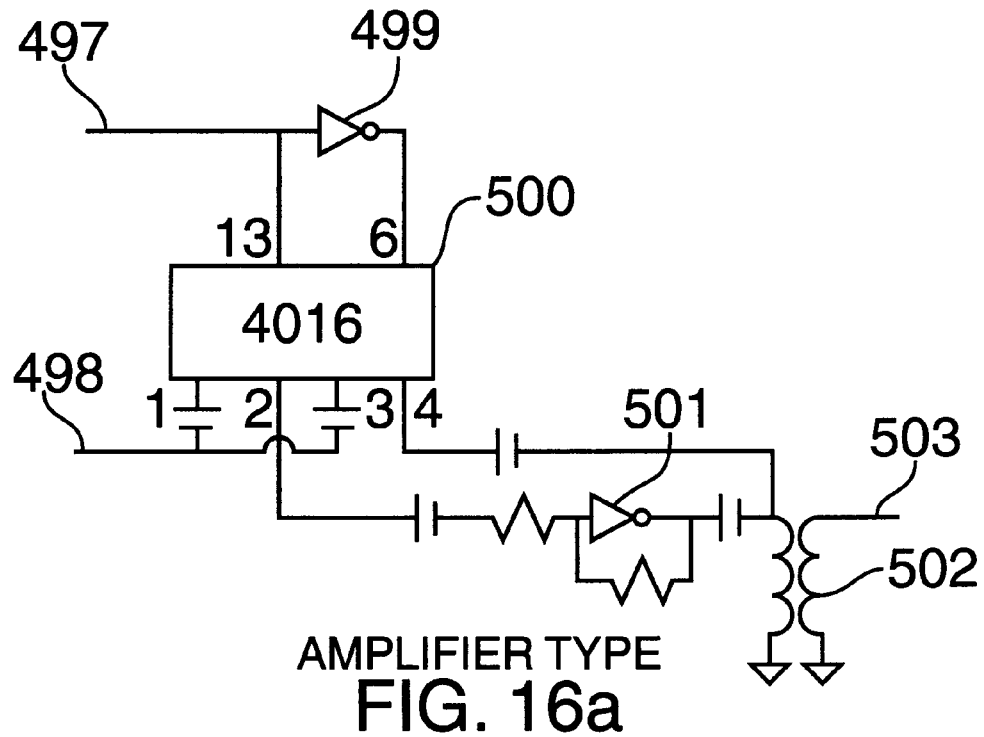
FIGS. 16A and 16B show details of two types of switched inverters.

The switched inverter described above, may be implemented using a digitally controlled analog switch 500 shown in FIG. 16. The chip type 4016 or 4066 may be used. They switch radio frequency signals at input 498. The control signal 497 is digital and switches channel outputs pin 2 and pin 4 inversely; that is, pin 2 passes signal when pin 4 does not and vice versa, because digital inverter 99 changes the polarity of 497. In FIG. 9A, the output of pin 2 passes through a linear amplifier 501 of odd number of stages and therefore the signal experiences a 180 degree phase shift or phase inversion with respect to signals passing through pin 4. Either signal is sent to output 503. The digital control signal 497 is applied to pin 13 and its inverse to pin 6.

Figure 16B:
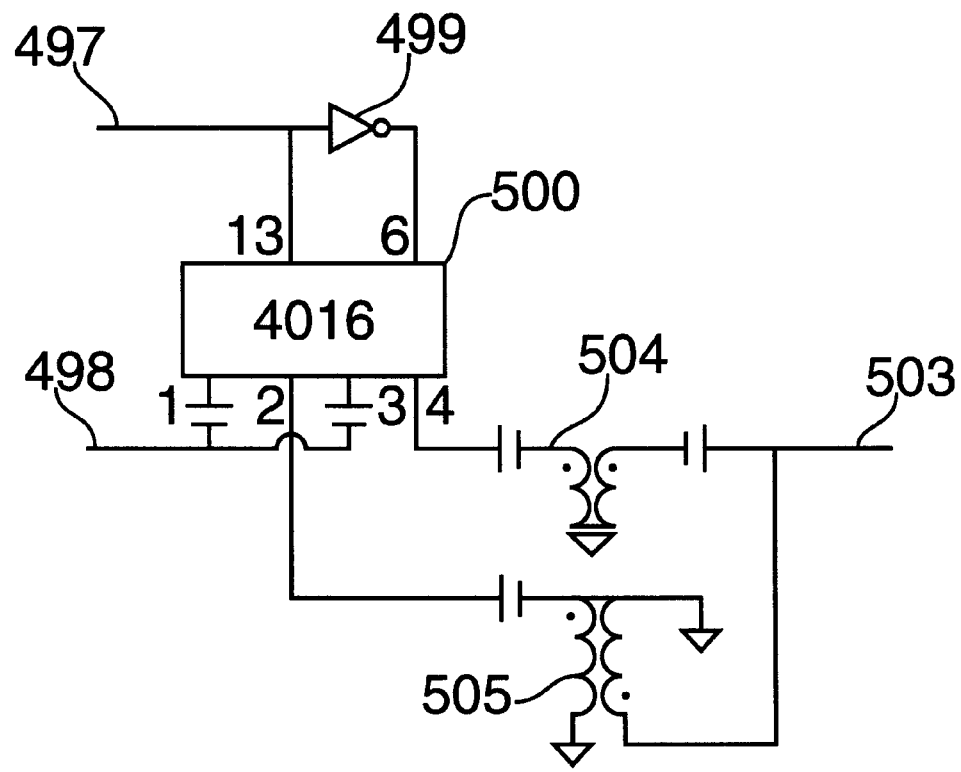

In FIG. 16*b*, the output of pin 2 passes through a transformer 505 in which the polarity of the signals in the secondary winding is reversed with respect to ground. The output of pin 4 is fed to a transformer 504, the polarity of the secondary of which is not inverted with respect to ground. The result of this is that the output of the transformers 503 will be shifted 180 degrees out of phase in accordance with the state of the input 497.

Switched inverter 500 is also used as a switch to control the loop signal. In this case, only one path is used such as 1 to 2, controlled by pin 13. When closed, the feedback path is completed and iterated signals add. When the switch is open no signal builds up.

Figure 17:
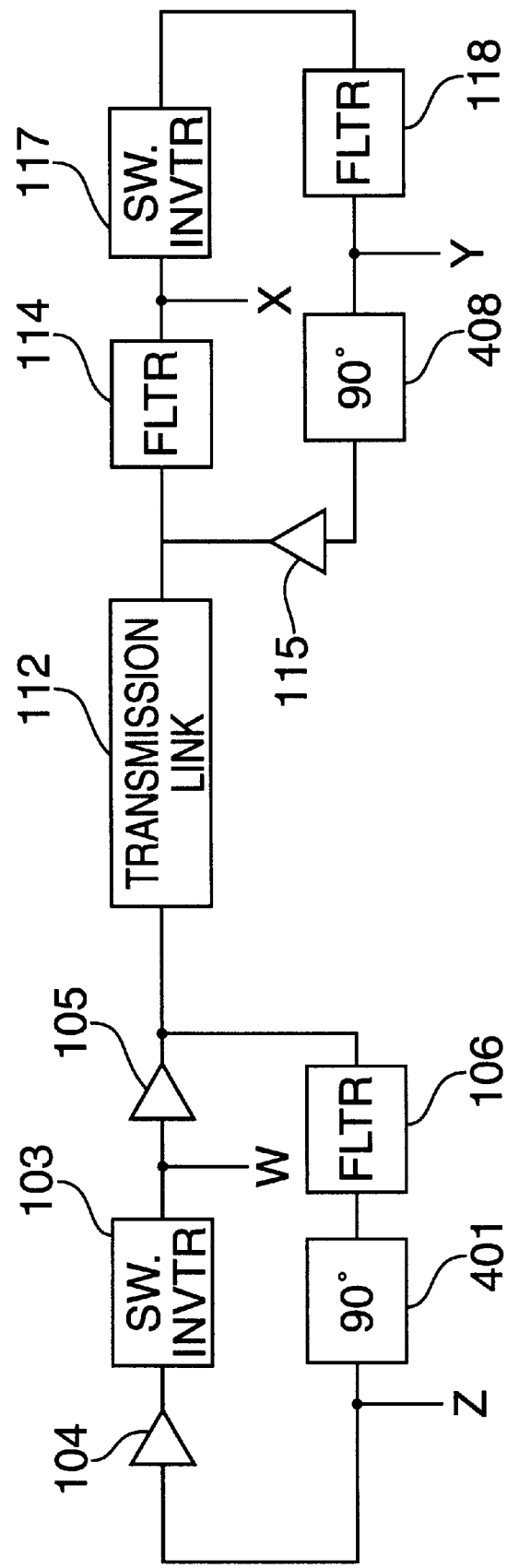
FIG. 17 shows a single channel transmission system.

A single channel may be used for transmission instead of a separate forward and return channel by making use of an additional 90 degree phase shifter in each terminal as shown in FIG. 17. The phase shifter is installed in the return line to cause the phase around the local loop to be always 90 degrees regardless of the setting of the inverting switch. The phase around the loop formed by the path around both terminals contains both 90 degree shifts and the phase inversions of both terminals. This merely inverts the sense of the inverting switches which can be compensated for by changing the sense of the codes applied to the inverting switches.

As FIG. 17 shows only one transmission link 112 is used. Filter 106 is connected to 112 instead of transmission link 113 which is not used. The new phase shifter 401 is connected to 106 and to amplifier 104 and to other branches (via z). The local terminal path is completed via switch invertor 103 which connects to the transmission link 112 via amplifier 115. (Other branches connect to 112 through 105 via w). This local path will not oscillate because the loop phase is always a multiple of 90 degrees.

The other terminal path includes filter 114, switch invertor 117, the new phase shifter 402 and amplifier 115. Other branches connect through x and y, Again the local loop phase is 90 degrees or a multiple thereof. The mutual loop containing the two terminals, however, can oscillate because the switch inverters can cause the loop phase to be multiples of 180 degrees.

Figure 18:
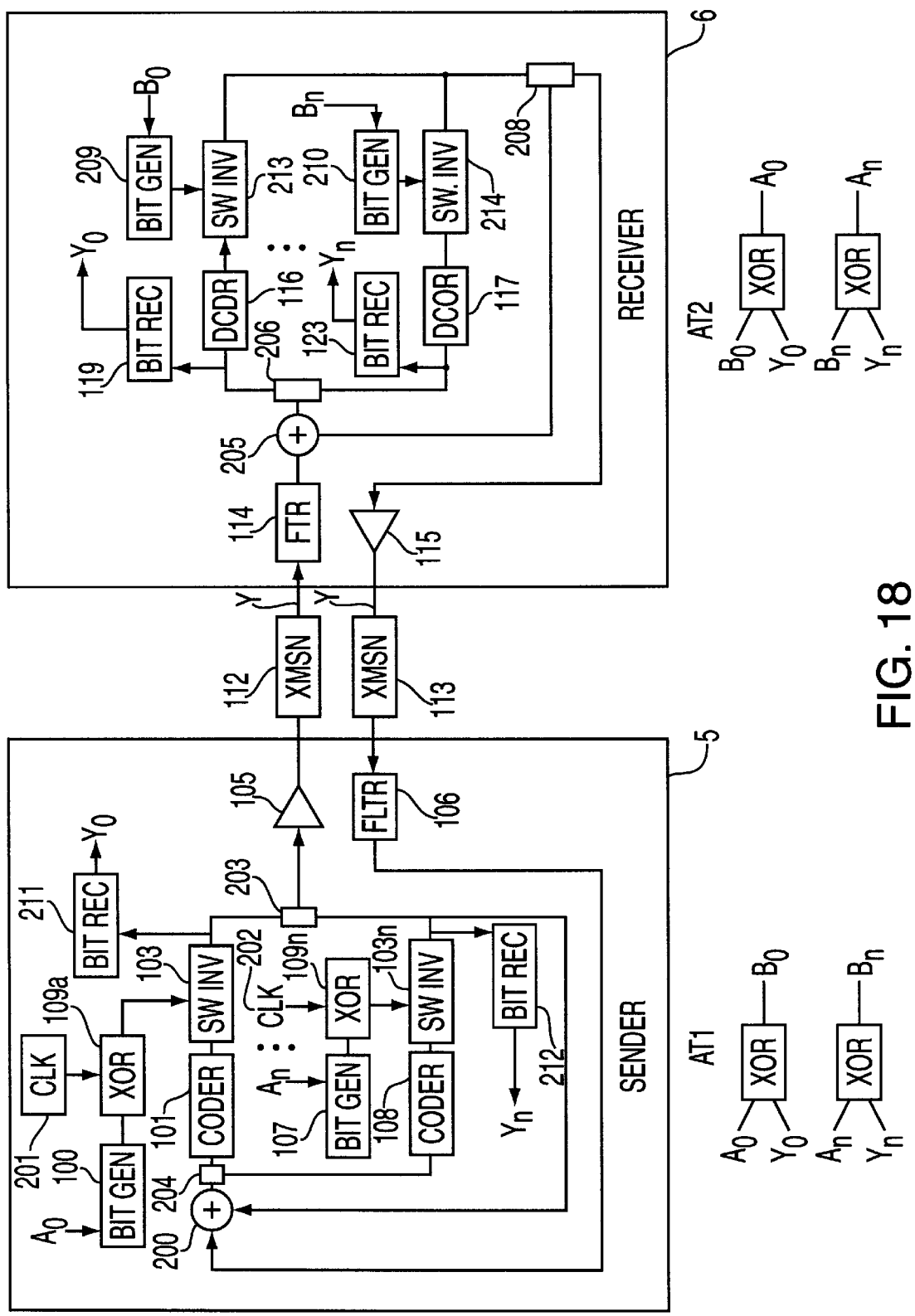
FIG. 18 is a secure two way system using inverters at the receiver.

By installing bit receivers in the sender unit 5 and bit generators operating switched inverters in the receiver unit 6 the same links can provide symmetrical two way communications. This system will have high noise immunity and security against eavesdropping in a similar manner as shown in U.S. Pat. No. 5,029,210. This system is shown in more detail in FIG. 18. Items 211 and 212 are the added bit receivers in unit 5, and represent two of the n receivers required by the system. Items 209 and 210 are the bit generators required in unit 6. These operate switched inverters 213 and 214. In this method the transmission bit on lines is Y, which is the modulo 2 sum of the inputs to each data branch, so that Unit 5 derives the data B from Unit 6 by XOR mixing the detected transmission Y with the data input A to that specific branch.

Figure 19:
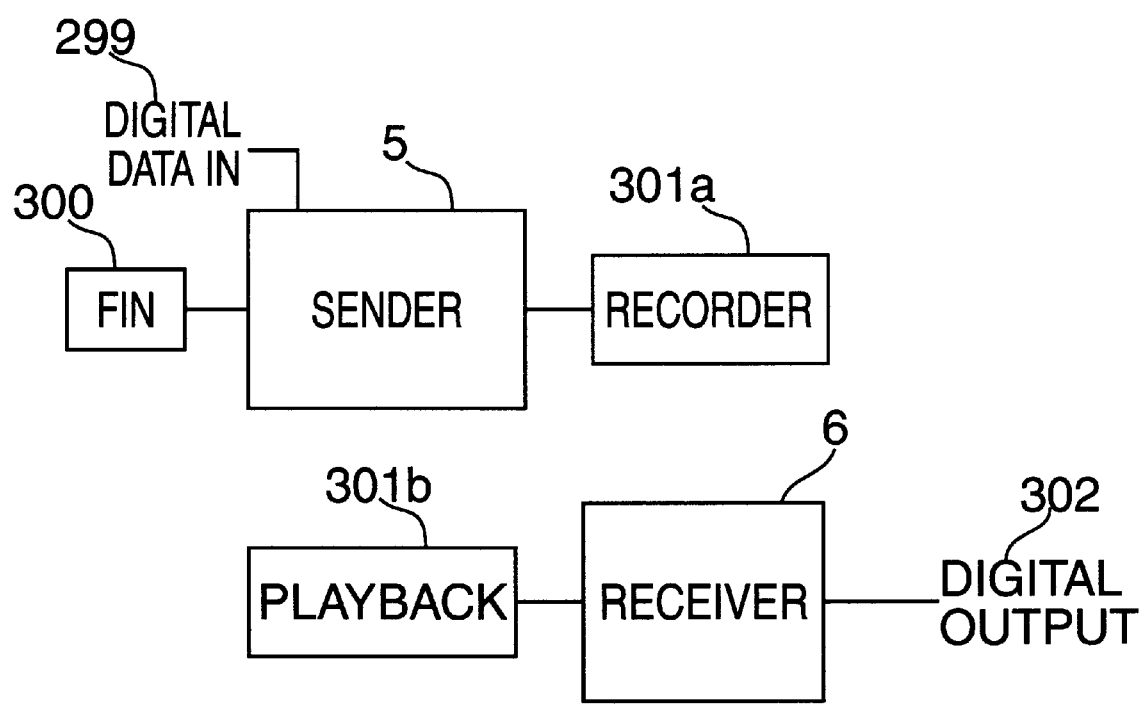
FIG. 19 is a digital storage system based on the inventive principles.

The Output of Sender 5 (FIG. 10) is suitable for recording on a medium such as magnetic tape. Magnetic tape recorders such as are used for analog voice recording should have sufficient amplitude range. This provides a means of greatly increasing the storage capacity of such devices. FIG. 19 shows such a method of storing and retrieving compressed digital information. Item 300 represents the source of closely spaced frequencies which unit 5 (the sender) derived from its input. Any such source may be used. Digital data is introduced into unit 5 in the same way as for the transmission system previously described. The output of 5 is the compressed signal, e.g., video which can be stored in narrow band recorder 301*a*. This output is multi frequency of the same bandwidth as the source 300. It will however vary in amplitude as the square root of the number of active "1" bits. The recorder will play back into the receiver 6 which will decode the information in the same manner as described for transmission.

Figure 20:
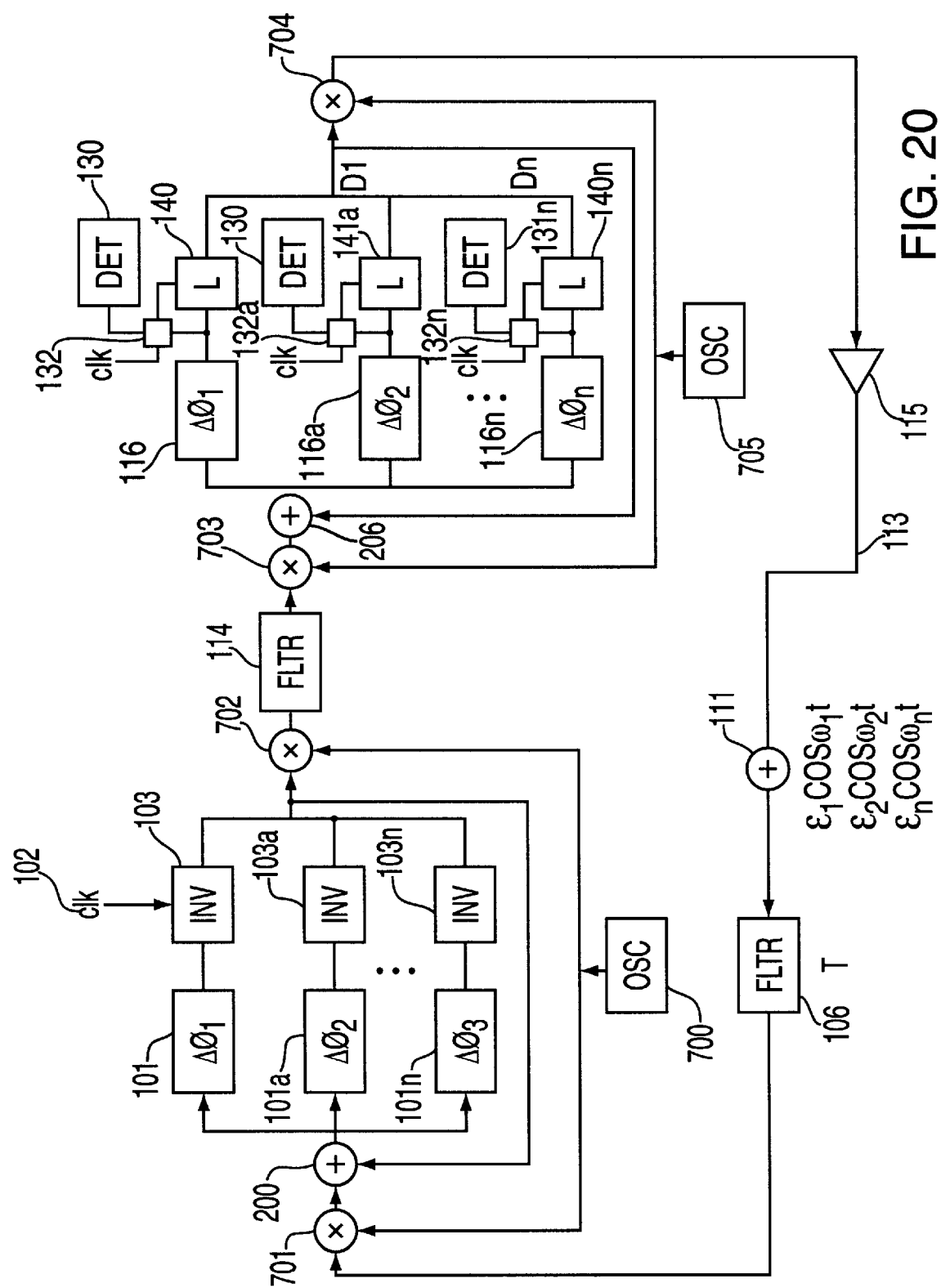
FIG. 20 is a frequency translated scanless television system using phase coding.

The STV receiver and sender units 1 and 2 may be operated at frequencies other than that of the transmission system 112 and 113 by translating received signals by up and down converting the STV outputs as shown in FIG. 20. This translation is advantageous because it allows the use of practically sized components for performing the functions of the sender and receiver units, and it also allows freedom in choosing the transmission channel frequency.

In the sender oscillator 700 output of frequency $\omega_0$ is mixed with the sender inputs $\omega_i$ in mixer 701 raising the input frequencies to the sender branch interactive system to $\omega_0+\omega_1$, $\omega_0+\omega_2$, $\omega_0+\omega_n$. Coder phase shifters 101, 101*a* . . . 101*n* operate as before (FIGS. 5 and 9), however, the capacitors and inductors used to provide the branch phase shifts are very much smaller. On the output side, the sender system signals are mixed in 702 with the oscillator 700 output, down-converting the frequencies back to $\omega_1$, $\omega_2$, $\omega_n$, for transmission.

Similarly, at the receiver end, the output of oscillator 705 is mixed with the input from the transmission link 112 in 703, so that the frequency input to the receiver iterative system is raised to $\omega_0+\omega_1$, $\omega_0$, $+\omega_2$, $\omega_0+\omega_n$. Again the components for the phase shifters 116, 117 and 118 are greatly reduced in size. An output of oscillator 705 is used to down-convert the receiver signals in mixer 704, when it is desired to send signals back to the sender.

This invention is a compressive method of transmitting digital information. We have shown a method whereby parallel branches can be coded to send ensembles of bits coded so that they can be added together and to a single transmit channel without interfering with each other (no intersymbol interference) and be uniquely retrieved in corresponding branches of a receiver equipped with the proper decoding means. At the correct sampling intervals the receiver decoding means allows the detection of the specific corresponding bit without any interference from any other bit in the ensemble. FIG. 6 demonstrates that the intersymbol non-interference is true in general for any value of compression. The actual bit detection is done by observing amplitude above a threshold.

A key component of this invention is the iterative method of modulating multiple simultaneous signals so that the multiple closely spaced signals can pass through a narrow pass filter which can normally pass only the common bit rate of the ensemble. This cannot be done by ordinary filters which would entail impractically high Q's and excessively long delays.

The bandwidth B of the transmission highway is determined by the common bit rate of the simultaneous bit ensemble. The number of bits per ensemble, n, is also the bandwidth (or data) compression ratio. The frequency spacing between bits of the ensemble is B/n. As the compression n becomes larger the sender output power to the transmission channel becomes larger because n multiplies the input noise power to the sender. Because the noise power is so low ($10^{-20}$ watts/herz) a compressed output of n=$10^6$ bits/bit would need very low power.

One way of implementing this system is by using resonant circuits in each branch. The Q of these circuits is determined only by the channel center frequency $f_0$ and the Channel bandwidth B, and not by the compression ratio n. This allows large compression ratios to be obtained with reasonably sized Q's.

This type of compression transmits all input information without error regardless of the nature or structure of the data source. This method of compression may be applied directly to the compressed storage of information by recording the information processed for transmission on a medium of sufficient dynamic range.

Additional methods of compression are described here which reduce the number of transmitted codes to describe an ensemble of bits representing a scene. In these methods, several dimensions and an identifier are used to specify the location of the pixels. In this way, for example, Nm locations may be defined by N+M codes. In this process the transmission codes grow more slowly in numbers with size of scene. AND circuits and comparators are used to reconstruct the original image.

Figure 21:
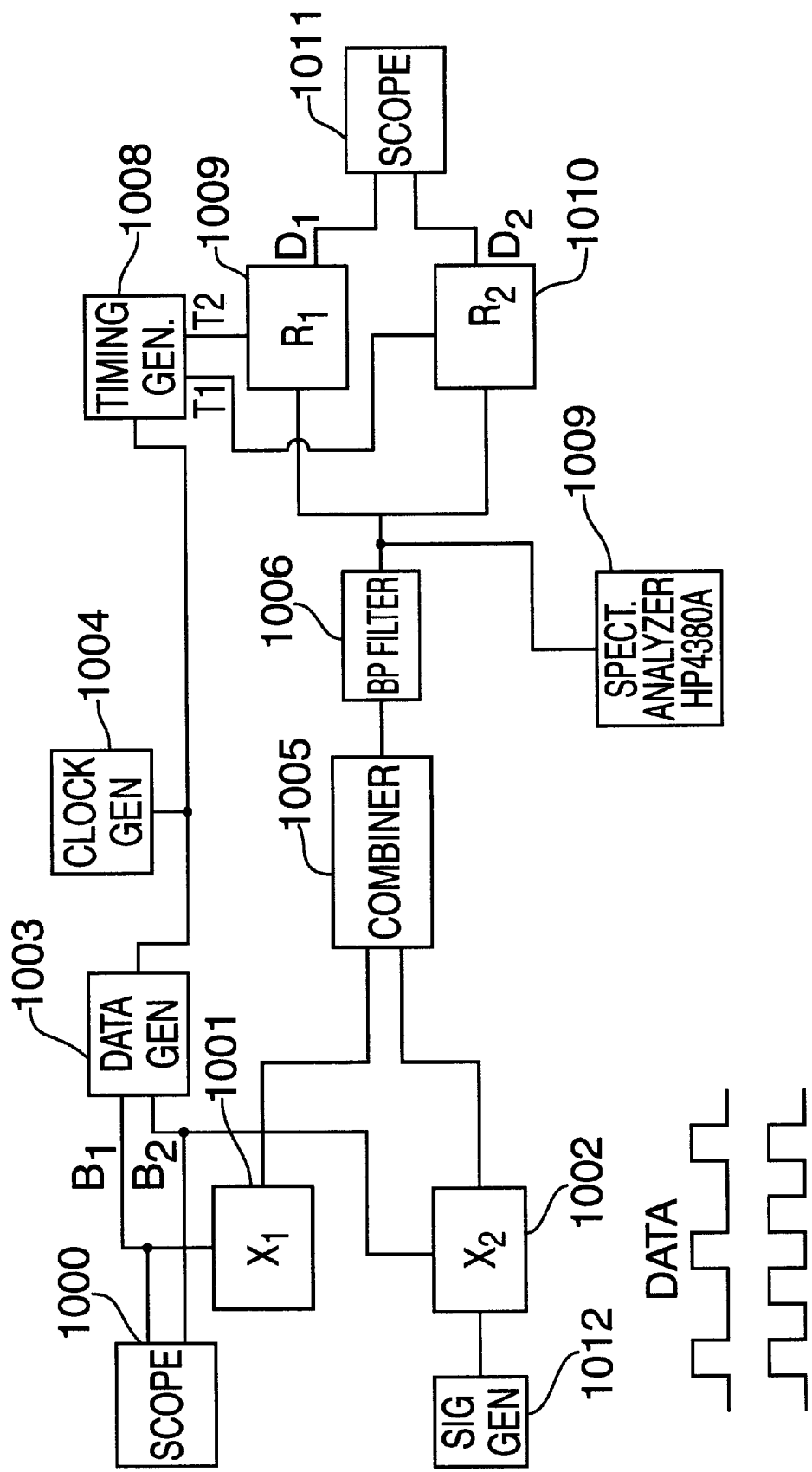
FIG. 21 is an experimental test set-up.

An experimental system was built and tested to demonstrate the invention, which is shown in FIG. 21. Two channels were used. Transmitter $X_1$ 1001 and Transmitter $X_2$ 1002 used the circuit shown in FIG. 9A. Receivers $R_1$ 1009 and $R_2$ 1010 used the cicuit shown in FIG. 9B. Data input patterns B1 for $X_1$ and B2 for $X_2$ were provided by data generator 1003, which was controlled by clock generator 1004. The output signals of the transmitters were combined in 1005, which was a linear summing amplifier. The combined signal supplied the bandpass filter 1006, which simulates the bandpass of a transmission line. In this case, the filter is centered at 20 khz and had a band bass of 20 khz. Spectrum Analyzer HP 4380a monitored the output of the transmission line (filter).

The Receivers 1009 and 1010 both received this output. Receiver $R_1$ 1009 received timing signal T1 from timing generator 1008, and receives timing signal T2 from 1008. The timing generator was also controlled by clock generator 1004. The outputs D1 and D2 of the respective receivers are monitored by Scope 1011. The input bit patterns were monitored by Scope 1000.

Signal generator 1012 was used as low signal source to calibrate the sensitivity of the receivers, and as an alternate way of starting the transmitters. The transmitters normally used their internal noise to start the iterative process. The signal generator showed that the receivers could detect signals as low as −60 dbm.

$X_1$ $_{and}$ $_{R1}$ were tuned to 26000 hz and $X_2$ and $R_2$ were tuned to 25000 hz. The respective bit patterns were received at the corresponding receivers only. At the same time the Spectrum Analyzer showed only two spectral lines, namely 25000 hz and 26000 hz to the finest resolution of the analyzer, 1 hz.

The bit rate was varied from 50 kbs (corresponding to half carrier intervals) to 10 kbs, showing it is possible to transmit 2 bits per $H_z$ per channel.

The results verified the compression capacity of the invention.

Although the invention has been described in terms of specific embodiments and applications, persons skilled in the art can, in light of this teaching, generate additional embodiments for the present and other applications without exceeding the scope or departing from the spirit of the claimed invention. Accordingly, it is to be understood that the drawings and description in this disclosure are proffered to facilitate comprehension of the invention, and should not be construed to limit the scope thereof.

What is claimed is:

1. A compressive transmission system, including apparatus at a sending location for converting multiple simultaneously available patterns of digital information bits into simultaneously transmittable information codes using a common information transmission channel of limited bandwidth capable of transmitting a single information bit, and further including apparatus at a receiving location for converting signals received from said common information transmission channel into simultaneously detectable bit indications which correspond to said patterns of simultaneously available digital information bits, whereby capacity of the information transmission channel is increased.

2. A compressive transmission system in accordance with claim 1, further including switched inverter means for controlling oscillatory energy in said common information transmission channel.

3. A compressive transmission system in accordance with claim 1, wherein there is further provided amplification and phase inversion means cooperatively operative at said sending and receiving locations.

4. A compressive transmission system in accordance with claim 3, wherein said sending location apparatus and said receiving location apparatus includes coding means for producing transmitted output only if corresponding complementary information codes exist at said receiving location.

5. A compressive transmission system in accordance with claim 4, wherein said sending location apparatus and said receiving location apparatus includes means for reducing said number of information codes.

6. A compressive communications system, including a sending station and a receiving station, each of said sending and receiving stations including a plurality of communication paths, the system comprising:

a communications highway connecting said plurality of sending communication paths to said plurality of receiving communication paths;

means included at said sending station for sequentially and selectively encoding information bits to be sent over said communications highway, said encoding means including a frequency selective resonant device located in each of said plurality of communication paths for providing a signal representing a respective information bit, said signal having a frequency correlated to the resonant frequency of said frequency resonant device in said paths;

means included in each of said plurality of communication paths for amplifying and selectively inverting the phase of each of said information bits; and means at said receiving station for decoding said encoded information bits, said decoding means including a corresponding frequency selective resonant device in each path responsive to a corresponding predetermined resonant frequency for retrieving from said path an information bit associated therewith.

7. A compressive communications system in accordance with claim 6, wherein said communication highway includes a single communication channel for both a forward and a return path for said information bits.

8. A compressive communications system in accordance with claim 6, wherein said encoding means encodes said information bits into code bits which are substantially fewer in number then said number of information bits.

9. A compressive communications system in accordance with claim 8, wherein said encoding means includes means for organizing said information bits into a geometric matrix, means for designating a unique position for each information bit in said geometric matrix with particular binary codes, and means for selectively combining said particular binary codes on a bit-by-bit basis prior to transmittal over said communications highway.

10. A compressive communications system in accordance with claim 9, wherein said decoding means includes means for comparing a stored binary code indicative of position in said geometric matrix with said particular binary code transmitted over said communications highway.

11. A compressive storage and retrieval system for the storage and retrieval of digital information bits, the system including:

means for converting multiple simultaneously available patterns of digital information bits into a predetermined number of coded information bits;

means for adding said coded information bits into a single composite signal;

means for storing said single composite signal in a storage medium; and means for retrieving said digital information bits by converting said composite signal into simultaneously available bit indications coresponding to said patterns of simultaneously available digital information bits.

12. A compressive storage system in accordance with claim 11, wherein said coded information bits codes are comprised of coresponding frequency codes.

13. A digital modulation method comprising the steps of:

modulating one of a group of signals with a bit of a group of bits through use of first circuit having a first signal adder and a first feedback loop including a first resonant circuit of predetermined center frequency, said first feedback loop for iteratively applying a feedback signal from an output of said first circuit to said first signal adder for addition with a low power signal present at an input of said first signal adder;

utilizing a switch circuit controlled by the bit stream to apply said feedback signal to said signal adder, whereby energy at said first circuit output increases with each successive iteration for enabling transmission of a carrier signal modulated with a bit of said bit stream;

demodulating the modulated carrier signal utilizing a second circuit having a second signal adder and a second feedback loop including a second resonant circuit having a corresponding center frequency as said first resonant circuit, said second feedback loop iteratively applying a feedback signal at an output of said second circuit to said second signal adder for addition with said modulated carrier signal present at said second signal adder; and, detecting the amplitude of the signal present in the second circuit to obtain bits of said bit stream.

14. The compressive communication system as claimed in claim 6, wherein said communications highway is bandwidth limited, each said signal at said resonant frequency of each path being within said bandwidth limit.

15. The compressive communication system as claimed in claim 6, wherein said frequency selective resonant device provides phase shifting of a signal input to said path, said encoding means including means for adding successive phase shifted signals generated in a path for a predetermined number of iterations to obtain said signal representing said information bit in said path.

16. The compressive communication system as claimed in claim 6, wherein said means for iteratively adding successively phase shifted signals in said path includes a summary device, said encoding means further including feedback means for returning each successive phase-shifted signal from an output of each said path to an input of said summing device during each iteration.

17. The compressive communication system as claimed in claim 6, wherein for each path, said predetermined number of iterations occurs simultaneously in a time-period corresponding to the time rate of change of said information bit.

18. A compressive transmission system in accordance with claim 1, wherein said apparatus at said receiving location includes local resonant feedback means for simultaneously decoding said simultaneously transmitted information codes to obtain each respective information bit from said group of simultaneously available patterns of digital information bits.

19. A compressive transmission system in accordance with claim 18, wherein said local resonant feedback means including means for demodulating from said multiple band of signals a signal of predetermined analog frequency corresponding to a respective information bit of said group of simultaneously available patterns of digital information bits.

20. A compressive transmission system, including apparatus at a sending location for converting multiple simultaneously available patterns of digital information bits into simultaneously transmittable information codes using a common information transmission channel of limited bandwidth capable of transmitting a single information bit, and further including apparatus at a receiving location for converting signals received from said common information transmission channel into simultaneously detectable bit indications which correspond to said patterns of simultaneously available digital information bits, whereby capacity of the information transmission channel is increased, wherein each transmitted code of said simultaneously transmitted information codes correlates to a respective predeterminable analog frequency, said simultaneously transmittable information codes are transmitted over said information channel as a multiple band of signals, and wherein said apparatus at said sending location includes local resonant feedback means for encoding each information bit of said group of simultaneously available patterns of digital information bits into said simultaneously transmittable information codes.

21. A superresonant circuit comprising:

means for receiving a stream of encoded data signals, each encoded data signal being received in successive time intervals, means for completely decoding a respective encoded data signal within a time duration of its corresponding time interval, wherein each data signal is encoded as a single frequency modulated pulse, said circuit further comprising:

an output connection;

a signal adder means for receiving said stream of encoded data signals at a first input;

a phase shift element responsive to said single frequency modulated pulse;

feedback means for providing a signal from said output connection to a second input of said adder means, said feedback and signal adder means operating to recirculate said signal within said superresonant circuit a plurality of times to enable decoding of said encoded signal within said time interval, wherein said superresonant circuit enables said signal to progressively tune to said single frequency of band of signals with each recirculation, wherein η recirculations occur to produce a detectable signal in said superresonant circuit, said η recirculations occurring in a period of time less than or equal to a time rate of change of said data signals, and wherein each said encoded signal occupies a bandwidth of a transmission channel reduced in proportion to the number η recirculations as observed at said output connection.

22. A superresonant circuit for encoding a stream of data signals, said circuit comprising:

means for receiving data signals in successive time intervals;

means for completely generating an encoded data signal for the received data signal within a time duration of a single time interval of said data signal, wherein said encoded signal is frequency encoded, wherein said superresonant circuit further comprises an output;

a signal adder means for receiving a continuous band of signals at multiple frequencies at a first input;

a phase shift element responsive to a signal at a specific frequency;

feedback means for providing a signal from said output connection to a second input of said adder means, said feedback and signal adder means operating to recirculate said signal within said superresonant circuit a plurality of times to enable encoding of said data signal within said one time interval, wherein said superresonant circuit further comprises means for suppressing energy in response to a said received data signal, and wherein η recirculations occur to produce said frequency encoded signal in said superresonant circuit, said η recirculations occurring in a period of time less than or equal to a time rate of change of said data signals.

* * * * *